US009468036B2

(12) United States Patent
Sambhwani et al.

(10) Patent No.: US 9,468,036 B2
(45) Date of Patent: Oct. 11, 2016

(54) REDUCED CIRCUIT-SWITCHED VOICE USER EQUIPMENT CURRENT USING DISCONTINUOUS TRANSMISSIONS ON DEDICATED CHANNELS

(71) Applicant: QUALCOMM Incorporated, San Diego, CA (US)

(72) Inventors: Sharad Deepak Sambhwani, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 14/307,360

(22) Filed: Jun. 17, 2014

(65) Prior Publication Data
US 2014/0369247 A1 Dec. 18, 2014

Related U.S. Application Data

(60) Provisional application No. 61/836,569, filed on Jun. 18, 2013.

(51) Int. Cl.
H04W 76/04 (2009.01)
H04W 52/44 (2009.01)
H04W 52/36 (2009.01)

(52) U.S. Cl.
CPC ......... H04W 76/048 (2013.01); H04W 52/365 (2013.01); H04W 52/44 (2013.01)

(58) Field of Classification Search
None
See application file for complete search history.

(56) References Cited

U.S. PATENT DOCUMENTS

2004/0202104 A1* 10/2004 Ishii ................. H04W 52/143 370/225
2009/0304024 A1* 12/2009 Jou ................... H04L 1/0025 370/465
2009/0305711 A1* 12/2009 Rinne ............... H04L 12/5695 455/450
2010/0322122 A1* 12/2010 Synnergren ......... H04W 28/06 370/310
2011/0195681 A1* 8/2011 Osterling ............ H04B 1/0053 455/127.1
2011/0310986 A1* 12/2011 Heo ..................... H04L 5/001 375/259
2012/0224548 A1* 9/2012 Marinier .............. H04L 1/0002 370/329
2012/0281675 A1* 11/2012 Liang .................. H04L 1/0047 370/331
2013/0107780 A1* 5/2013 Choi ................. H04W 52/0209 370/311
2013/0242889 A1* 9/2013 Khoryaev ............. H04L 5/1469 370/329
2013/0322259 A1* 12/2013 Chung ................. H04L 1/1607 370/241
2014/0281843 A1* 9/2014 Lo ........................... G06F 11/08 714/807

(Continued)

FOREIGN PATENT DOCUMENTS

WO WO-2011063568 A1 6/2011

OTHER PUBLICATIONS

International Search Report and Written Opinion—PCT/US2014/042944—ISA/EPO—Jan. 8, 2015.
Qualcomm Incorporated: "TP on Section 5.1 on Uplink Physical Layer Enhancements", 3GPP Draft; R1-132699, 3rd Generation Partnership Project (3GPP), Mobile Competence Centre; 650, Route Des Lucioles; F-06921 Sophia-Antipolis Cedex; France, vol. RAN WG1, No. Fukuoka; May 20, 2013-May 24, 2013, pp. 1-12, May 29, 2013 (May 29, 2013), XP050698549, Retrieved from the Internet: URL:http://www.3gpp.org/ftp/tsg_ran/WG1_RL1/TSGR1_73/Docs/ [retrieved on May 29, 2013].

Primary Examiner — Chirag Shah
Assistant Examiner — Suk Jin Kang
(74) Attorney, Agent, or Firm — Loza & Loza LLP

(57) ABSTRACT

Aspects of the disclosure are directed to a method, apparatus, and computer software for wireless communication. In various examples, DTX is enabled for the transmission of voice frames corresponding to a circuit-switched voice call. That is, the voice frames may be transmitted during a portion of a transmission time interval TTI that is less than an entirety of the TTI (for example, during half of the TTI). The transmission may be suspended during a remainder of the TTI following the portion of the TTI.

28 Claims, 13 Drawing Sheets

(56) References Cited

U.S. PATENT DOCUMENTS

| | | | |
|---|---|---|---|
| 2014/0286214 A1* | 9/2014 | Chui | H04W 76/048 370/311 |
| 2014/0293847 A1* | 10/2014 | Tsai | H04L 5/14 370/281 |
| 2014/0321286 A1* | 10/2014 | Yavuz | H04L 1/0007 370/236 |
| 2014/0321440 A1* | 10/2014 | Yavuz | H04L 1/0007 370/336 |
| 2014/0334363 A1* | 11/2014 | Li | H04W 52/58 370/311 |
| 2015/0009874 A1* | 1/2015 | Edara | H04W 52/0225 370/311 |
| 2015/0016430 A1* | 1/2015 | Yuan | H04L 1/1812 370/336 |

\* cited by examiner

REDUCED CIRCUIT-SWITCHED VOICE USER EQUIPMENT CURRENT USING DISCONTINUOUS TRANSMISSIONS ON DEDICATED CHANNELS

CROSS-REFERENCE TO RELATED APPLICATIONS

This application claims priority to and the benefit of U.S. provisional patent application No. 61/836,569 filed in the United States Patent And Trademark Office on Jun. 18, 2013, the entire content of which is incorporated herein by reference.

TECHNICAL FIELD

Aspects of the present disclosure relate generally to wireless communication systems, and more particularly, to discontinuous transmission and reception.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). As the demand for mobile broadband access continues to increase, research and development continue to advance the UMTS technologies not only to meet the growing demand for mobile broadband access, but to advance and enhance the user experience with mobile communications.

Generally, a transmitter or receiver in a battery-powered wireless communication device may be powered-on to facilitate communication, such as a circuit-switched voice call. However, powering-on a transmitter or receiver can have a detrimental impact on battery-life in battery-powered application environments. Modifications to conventional communication techniques are needed in order to reduce power consumption. For example, if a reduction in terms of the time it takes to transmit data can be achieved, then a transmitter and/or receiver can be powered-down when not in use.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication. Here, the method includes transmitting voice frames corresponding to a circuit-switched voice call during a portion of the TTI that is less than an entirety of the TTI, and suspending the transmitting of voice frames during a remainder of the TTI following the portion of the TTI to enable discontinuous transmission (DTX) during the circuit-switched voice call.

Another aspect of the disclosure provides an apparatus for wireless communication, including at least one processor and a computer-readable medium having instructions stored thereon coupled to the at least one processor. Here, the at least one processor is configured to execute the instructions to cause the apparatus to transmit voice frames corresponding to a circuit-switched voice call during a portion of a TTI that is less than an entirety of the TTI, and to suspend the transmission of voice frames during a remainder of the TTI following the portion of the TTI to enable discontinuous transmission (DTX) during the circuit-switched voice call.

Another aspect of the disclosure provides an apparatus for wireless communication. Here, the apparatus includes means for transmitting voice frames corresponding to a circuit-switched voice call during a portion of a transmission time interval (TTI) that is less than an entirety of the TTI, and means for suspending the transmitting of voice frames during a remainder of the TTI following the portion of the TTI to enable discontinuous transmission (DTX) during the circuit-switched voice call.

Another aspect of the disclosure provides a computer-readable medium storing computer executable code. Here, the computer-readable medium includes instructions for causing a computer to transmit voice frames corresponding to a circuit-switched voice call during a portion of a TTI that is less than an entirety of the TTI, and instructions for causing a computer to suspend the transmitting of voice frames during a remainder of the TTI following the portion of the TTI to enable discontinuous transmission (DTX) during the circuit-switched voice call.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure are directed to downlink (DL) and uplink (UL) discontinuous reception (DRX) and discontinuous transmission (DTX). For example, DTX may be used in a circuit-switched environment to support voice calls. DTX may provide for power savings relative to a continuous transmission.

Currently, circuit-switched calls utilize a 20 ms transmission time interval (TTI). Aspects of the disclosure may be used to reduce the TTI that is effectively used. For example, a voice packet may be available for transmission at the start of a 20 ms TTI window, but the actual transmission of that packet might not span or consume the entire TTI window, such that the packet only consumes a portion of the TTI window when transmitted. In this case, the transmitting device may suspend its transmission for a portion of the TTI window. For example, the portion of the TTI window may correspond to half of the entire TTI window. During a second portion or a remainder of the TTI window that is not consumed by a transmission of voice packets, a transmitter and/or receiver may suspend, power-down, or turn-off, thereby enabling power savings. In some instances, one or more dedicated physical control channel (DPCCH) parameters are transmitted on a pre-determined number of slots during the remainder of the TTI prior to the start of a next TTI.

Figure 1:
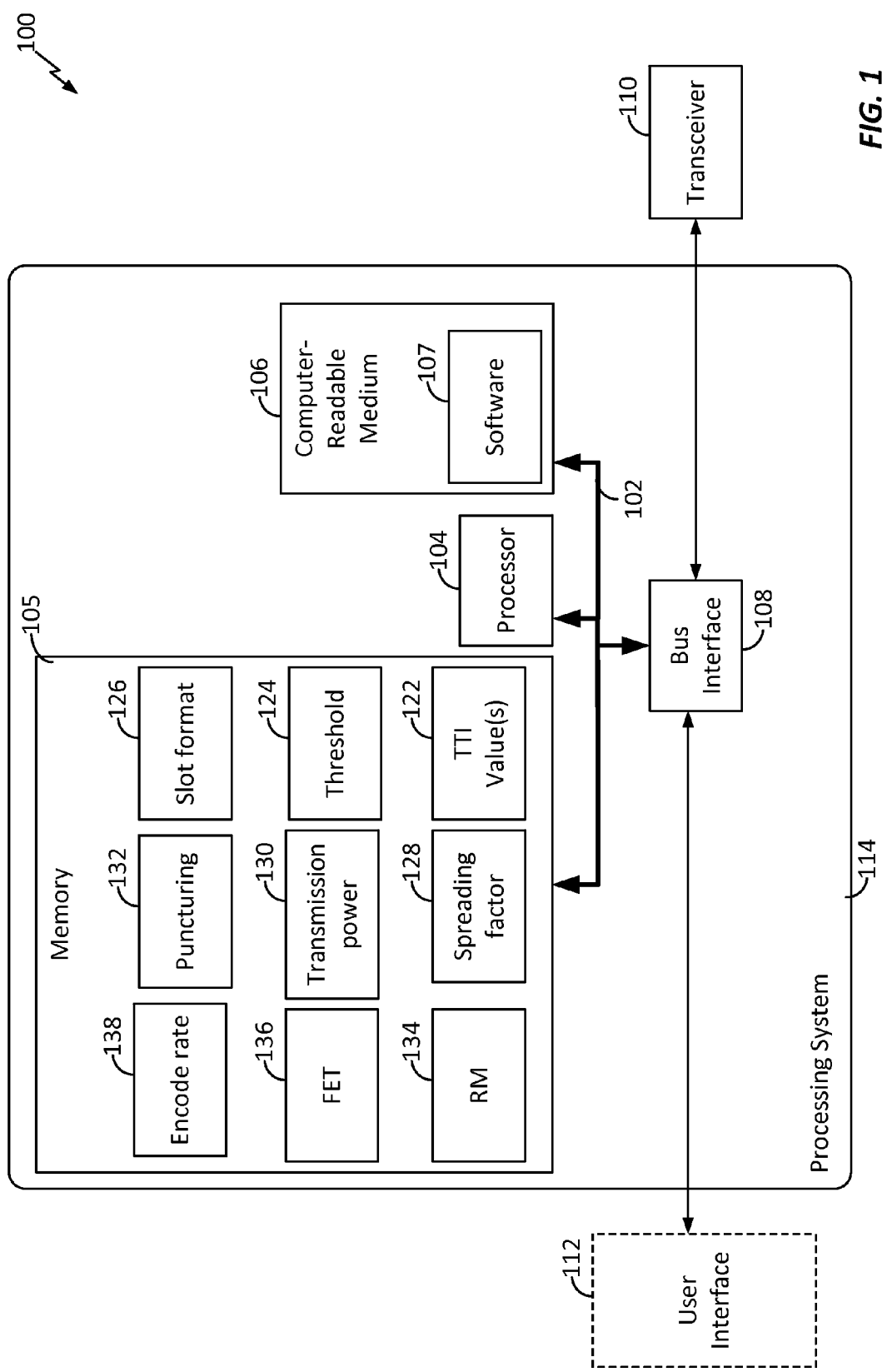
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a user equipment (UE) as illustrated in any one or more of FIGS. 2, 3, and 5. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus 100, a user interface 112 (e.g., keypad, display, speaker, microphone, joystick) may also be provided.

As shown in FIG. 1, one or more transmission time interval (TTI) parameters or values 122 may be stored in the memory 105. The TTI values 122 may correspond to the entirety or portions of a TTI or TTI window. For example, a first value 122 may correspond to 10 ms or half a TTI window, where the TTI window may be 20 ms and selected for a circuit-switched voice call. Of course, any suitable value or values may be stored as the TTI value(s) 122. The processor 104 may be operative on the basis of one or more TTI values 122 to enable discontinuous transmission (DTX) and discontinuous reception (DRX) operations during a circuit-switched voice call. For example, where the first TTI value 122 is half the TTI window, use of the first TTI value 122 may entail transmission or reception of voice frames on alternate portions of the entire TTI window. The memory 105 is shown as including a number of additional parameters or values 124-138. The parameters 124-138 are referenced here as a prelude to a more detailed description of their role and function below.

The processor 104 is responsible for managing the bus 102 and general processing, including the execution of software 107 stored on the computer-readable medium 106. The software 107, when executed by the processor 104, causes the processing system 114 to perform the various functions described below for any particular apparatus. The computer-readable medium 106 may also be used for storing data that is manipulated by the processor 104 when executing software. In accordance with aspects of the disclosure, the software 107 may be included in the memory 105.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
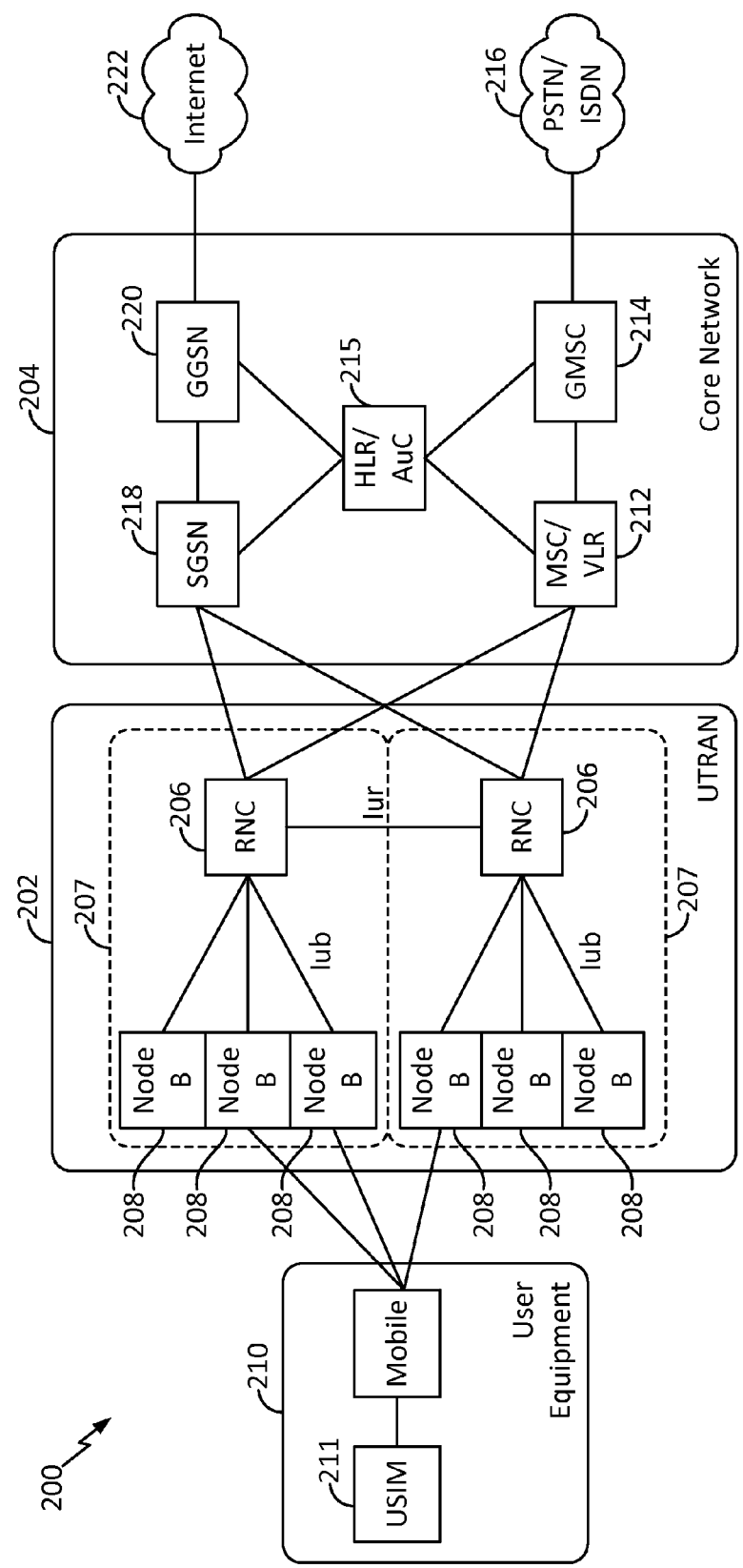
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

Figure 3:
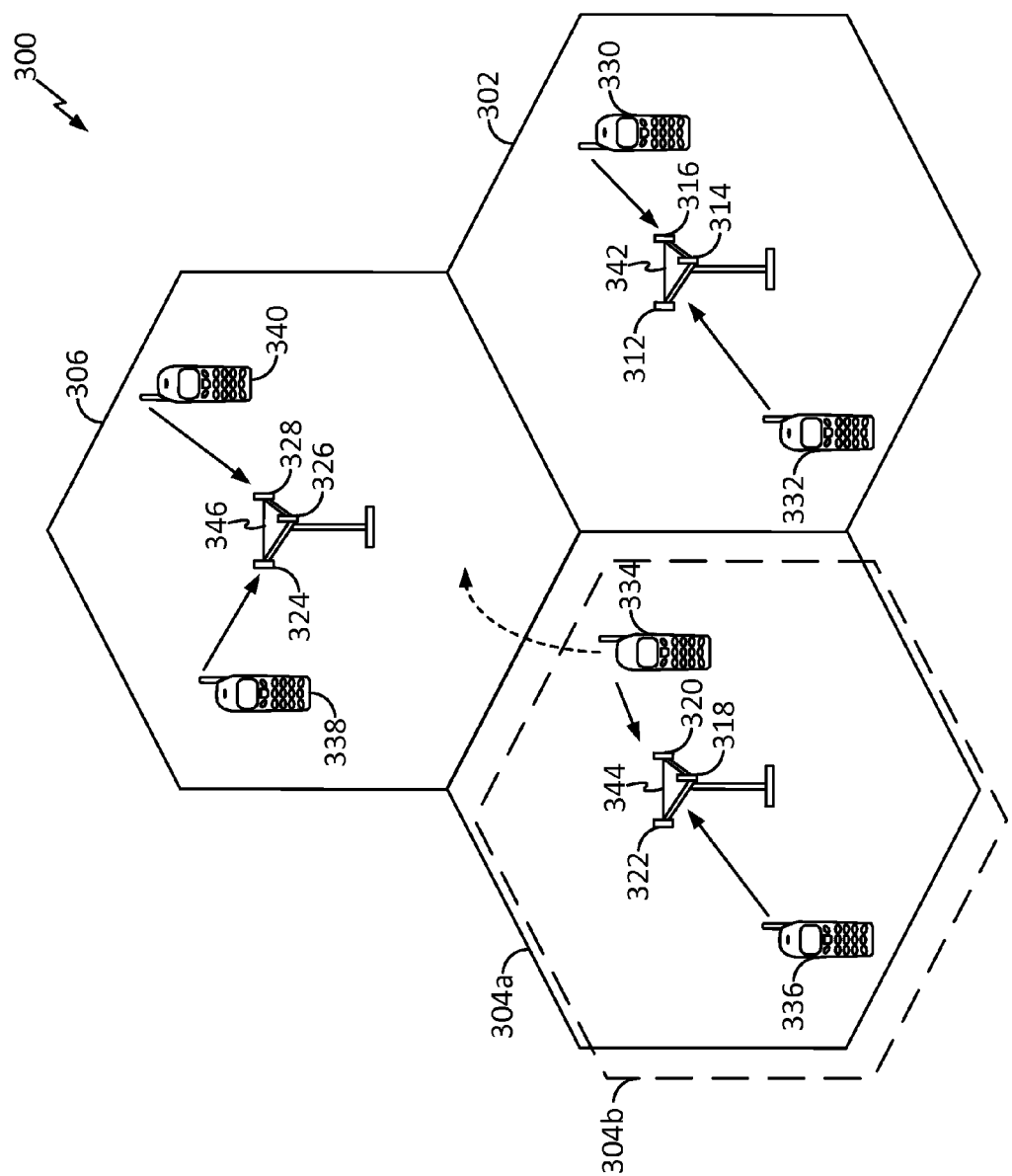
FIG. 3 is a conceptual diagram illustrating an example of an access network.

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel (DPCH) or fractional downlink dedicated physical channel (F-DPCH) to the UE 336 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit-switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 4:
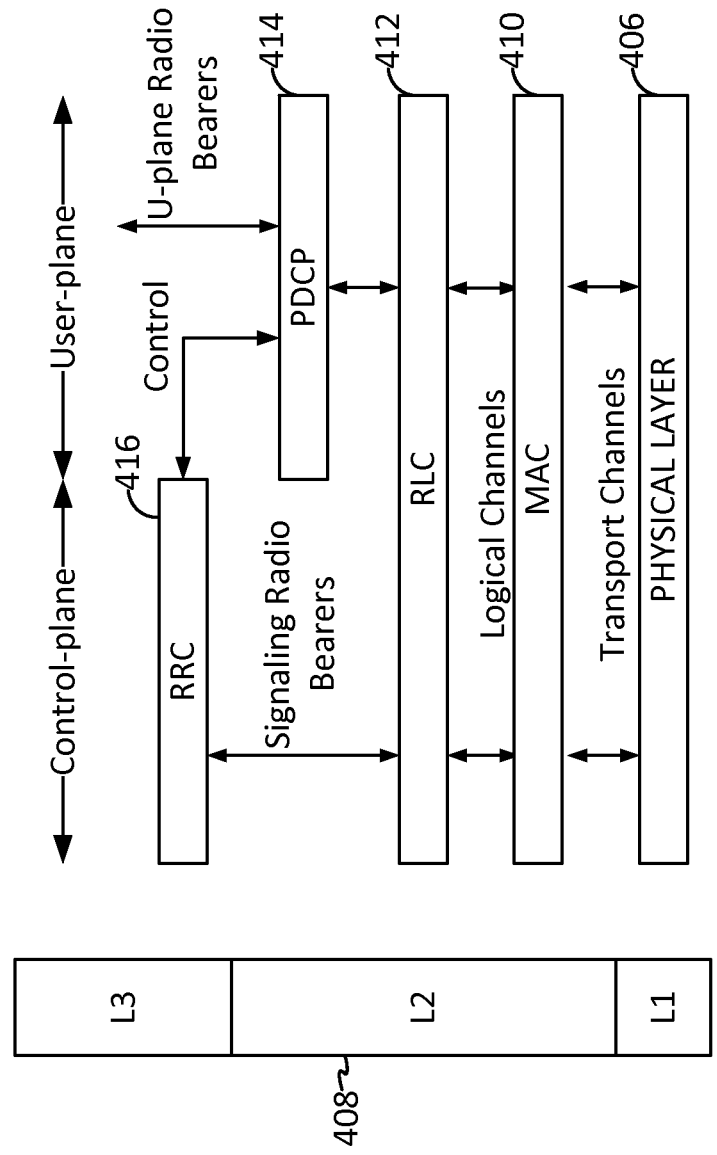
FIG. 4 is a conceptual diagram illustrating an example of a radio protocol architecture for the user and control plane.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and Node B 208 over the physical layer 406.

At Layer 3, the RRC layer 416 handles the control plane signaling between the UE 210 and the Node B 208. RRC layer 416 includes a number of functional entities for routing higher layer messages, handling broadcasting and paging functions, establishing and configuring radio bearers, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 5:
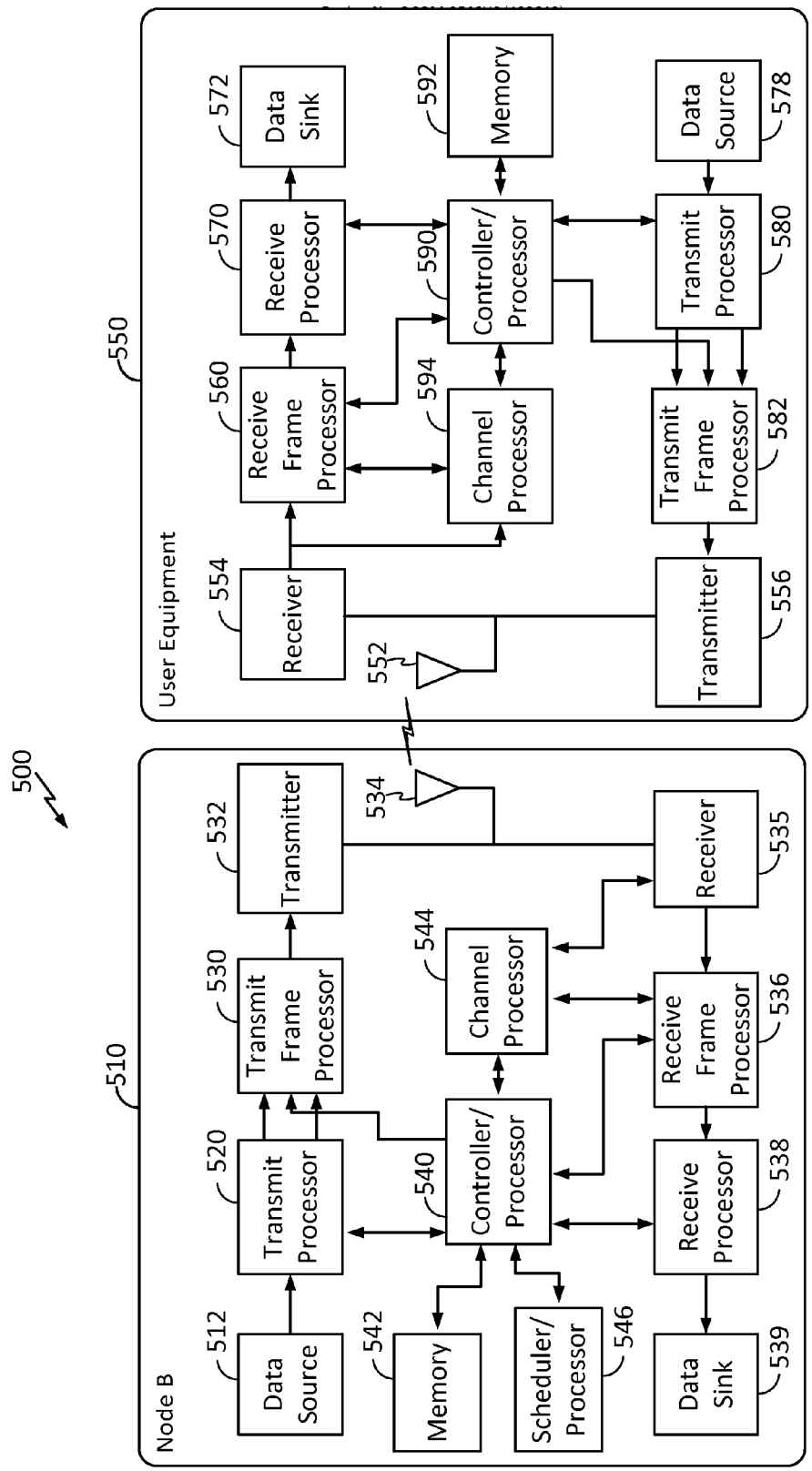
FIG. 5 is a block diagram conceptually illustrating an example of a Node B in communication with a user equipment (UE) in a telecommunications system.

FIG. 5 is a block diagram of an exemplary Node B 510 in communication with an exemplary UE 550, where the Node B 510 may be the Node B 208 in FIG. 2, and the UE 550 may be the UE 210 in FIG. 2. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Having just described various types of systems and apparatuses, attention is now turned to different types of functions, algorithms, and structures that may be employed in connection with such systems and apparatuses. In this era of complex smartphone devices and applications, an optimization of UE battery life may enhance a smartphone user experience. Circuit-switched (CS) voice service, transmitted on dedicated channels such as the uplink or downlink dedicated physical channel (DPCH), continues to remain an important application for the end user in UMTS networks. However, CS voice service consumes a fair amount of UE modem transceiver current when compared to 2G cellular technologies (e.g., GSM).

One technique or method to achieve UE modem current savings is to introduce discontinuous transmissions (DTX) on both the downlink and uplink, which will be familiar to those of ordinary skill in the art. Broadly, DTX operations provide for the periodic or intermittent shutting down of one or more power-consuming portions of a transceiver (e.g., including but not limited to amplifier circuitry within the transmitter 556). However, DTX operations could potentially lead to a link efficiency impact as well as an uplink link budget impact.

An aspect of the disclosure is directed to a reuse of existing physical layer (e.g., physical layer 406 of FIG. 4) transmit and receive configurations available in UMTS to support discontinuous transmission (DTX) of circuit-switched voice calls (e.g., utilizing an adaptive multi-rate (AMR) 12.2 kbps CS voice codec) on dedicated channels, without necessarily compromising the impact to link efficiency on either link. Further aspects are directed to reducing or avoiding uplink coverage impact in regions within a cell when the UE is power headroom limited.

In conventional circuit-switched voice calls in UMTS, a multi-rate speech codec called AMR is used. Details of the operation of the conventional AMR codec are well-known to those of ordinary skill in the art, and are accordingly omitted from the present disclosure. One aspect of the AMR codec is that, during the rearrangement and encoding of bits corresponding to the voice data, the bits are sorted according to their sensitivity to errors, and are accordingly separated into three classes of importance corresponding to error sensitivity: class A, class B, and class C. Class A is the most sensitive to errors, and therefore, in a conventional codec, class A bits are subject to the strongest channel coding.

Without loss of generality, an AMR 12.2 kbps CS voice codec may be assumed in order to describe the techniques below. The techniques are also applicable to other codecs such as AMR 5.9 kbps or enhanced voice service (EVS).

Figure 6:
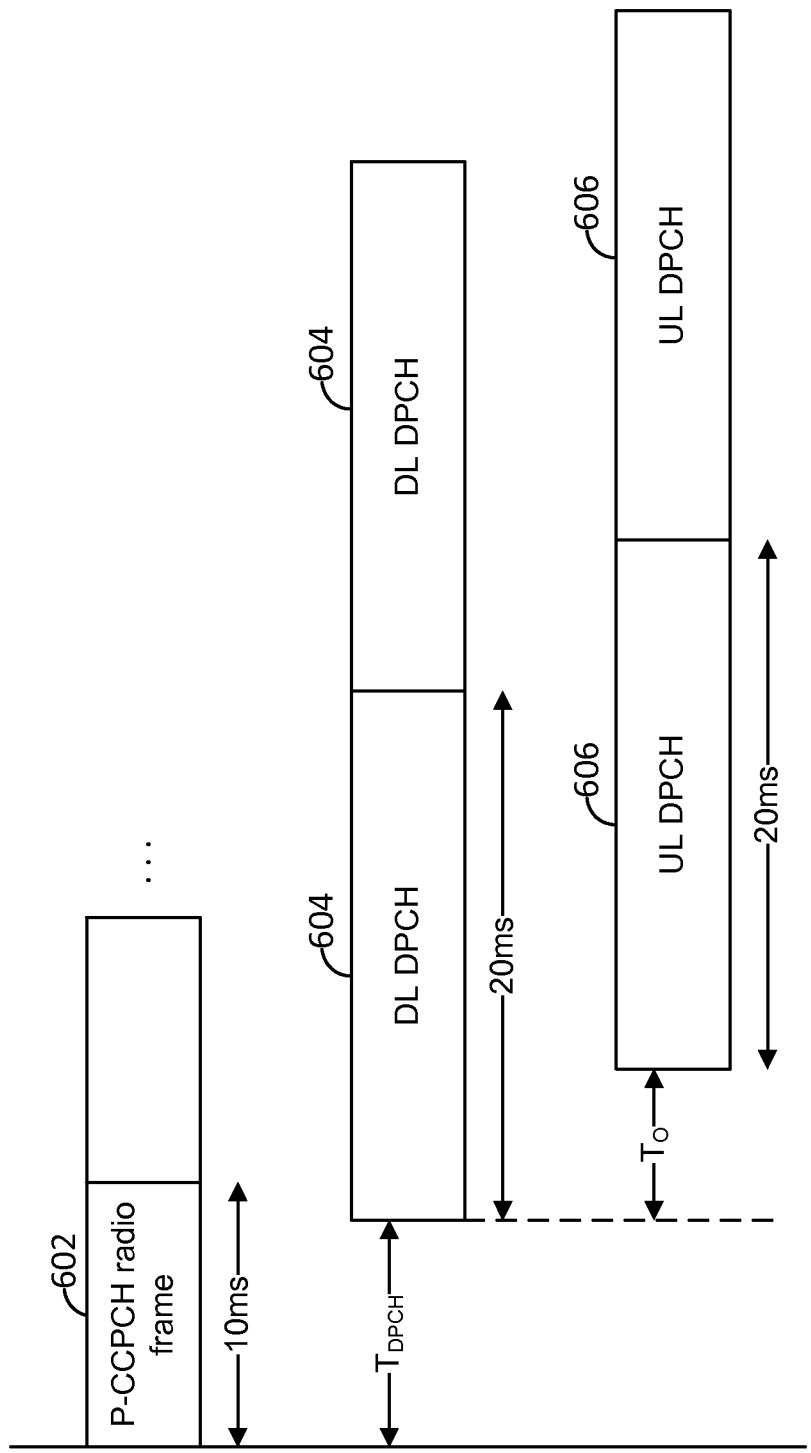
FIG. 6 is a conceptual diagram of a circuit-switched (CS) Voice transmission on a dedicated channel (DCH) using a 20 ms transmission time interval (TTI).

FIG. 6 is a timing diagram that illustrates the conventional transmission format of AMR 12.2 kbps circuit-switched voice transmissions on the DPCH using a 20 ms TTI. Note that when a signalling message is also transmitted, it is encoded and time division multiplexed with the encoded circuit-switched voice frames, and spans a 40 ms TTI (not shown in FIG. 6 for sake of simplicity).

As shown in FIG. 6, a Primary Common Control Physical Channel (P-CCPCH) radio frame 602 may be transmitted using a 10 ms TTI. The P-CCPCH generally carries broadcast information, including the broadcast channel (BCH), which contains information that UEs (e.g., UEs of FIGS. 2, 3, and 5) use for accessing the system. While a single P-CCPCH radio frame 602 is shown, more than one such frame may be transmitted. Downlink (DL) DPCH packets 604 and uplink (UL) DPCH packets 606 may utilize a 20 ms TTI. As shown, the start of the first or leftmost DL DPCH packet 604 may be offset from the start of the P-CCPCH radio frame 602 by a time $T_{DPCH}$. Similarly, the start of the first or leftmost UL DPCH packet 606 may be offset from the start of the first DL DPCH packet 604 by a time $T_o$, which may be equal to 1024 chips.

Figure 7:
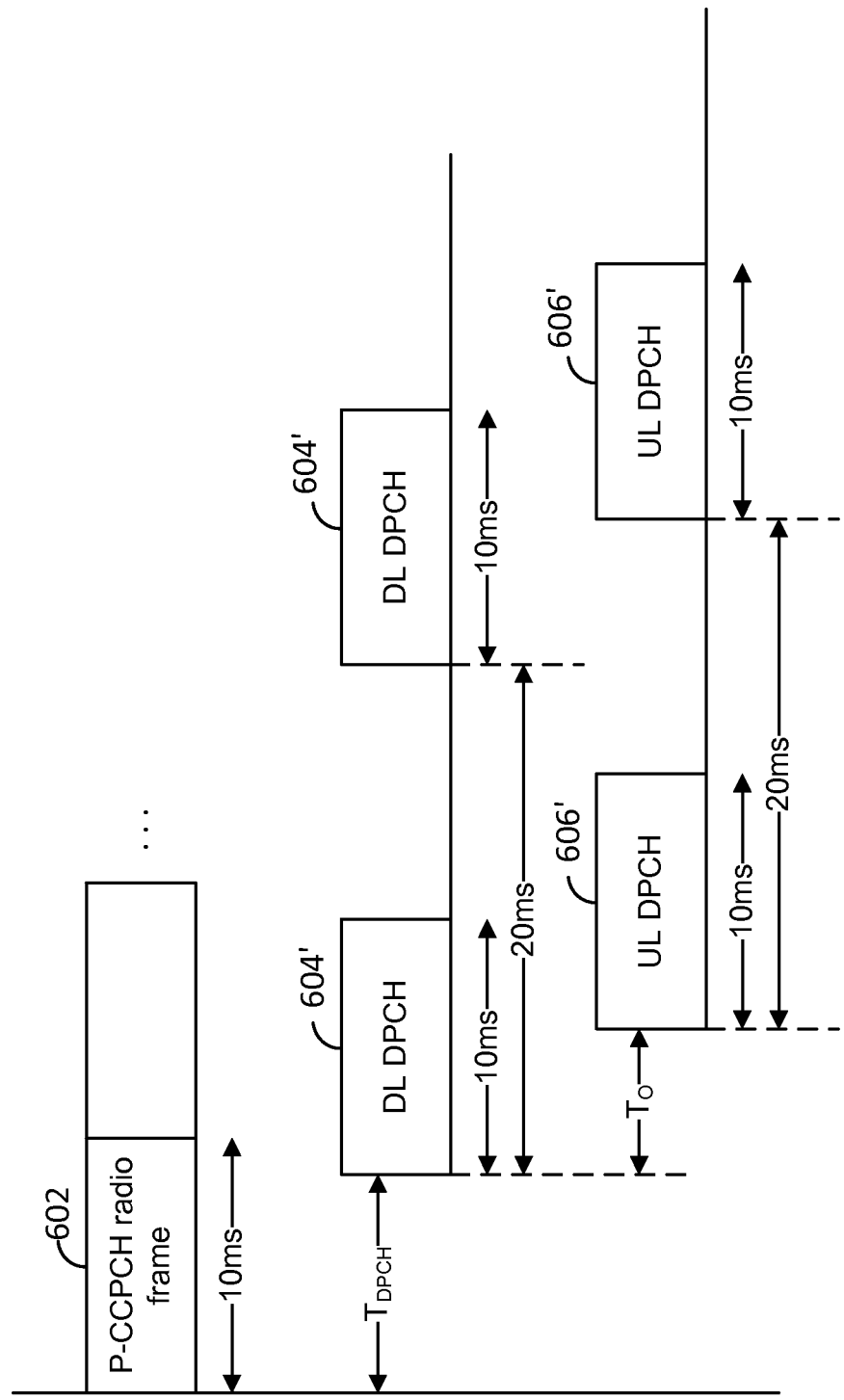
FIG. 7 is a conceptual diagram of a CS Voice transmission on DCH using a portion of the TTI of FIG. 6.

One way of achieving UE battery power consumption savings, is to consider the shortening of transmission and reception at the UE (e.g., UE 550) by introducing discontinuous transmissions as shown in FIG. 7. In the example illustrated in FIG. 7, voice packets on both uplink (UL) 606' and downlink (DL) 604' are still generated every 20 ms at the voice codec, but are transmitted over the air using 10 ms TTI. In other words, during the first portion (e.g., the first 10 ms) of the entire 20 ms TTI window a transmission of voice packets may occur and during the second portion or remainder (e.g., the second 10 ms) of the entire 20 ms TTI window a transmission of voice packets might not occur, such that a transmission of voice packets may be suspended during this second portion or remainder. Here, suspending the transmission of voice packets may include temporarily discontinuing (e.g., gating or turning off) the transmission of the voice packets. The suspension of the transmission may be accomplished in various examples by depowering one or more components or portions of the transceiver 110 (see FIG. 1), or one or more components or portions of the UE 550 including but not limited to the transmitter 556 (or subcomponents of the transmitter 556 such as a power amplifier). In general, the transmission may take place during the initial portion of the TTI window, although this is not necessarily the case. Broadly, the portion of the TTI window during which the transmission takes place may be referred to as a first portion of the TTI, while the portion of the TTI window during which the transmission is suspended may be referred to as a second portion or remainder of the TTI. That is, in an example where the transmission takes place during the initial portion of the TTI window, the second portion or remainder of the TTI may extend from the end of the transmission until the end of the TTI window. In an example where the transmission takes place during any portion other than the initial portion of the TTI window, the second portion or remainder of the TTI may include part of the TTI window prior to and after the first portion, broadly including all of the TTI window exclusive of the portion of the TTI window during which the transmission takes place. In this manner, the UE transmitter 556 can be gated, e.g., 50% of the time leading to a significant UE modem current savings.

In a further aspect of the disclosure, additional or alternative techniques may be used to obtain power savings. For example, a slot format for transmitted data or packets may exclude pilot bits. Here, by excluding pilot bits from the slot format associated with the transmission of frames, the data information corresponding to the frame may be organized into fewer slots or symbols. The removal of pilot bits provides for a greater number of bits for data. Power savings may be obtained from not having to transmit pilot bits. In this respect, a slot format parameter 126 stored in memory 105 of FIG. 1 may be examined by the processor 104 to determine a slot format for data or a packet. The slot format parameter 126 may include an indication or specification of whether pilot bits are included.

During a DTX configuration, wherein voice packets or frames are transmitted utilizing only a portion of a TTI and transmission is suspended for the remainder of the TTI, the instantaneous transmitter power may be increased relative to a non-DTX configuration in which the entirety of the TTI is used for the transmission of packets. For example, during DTX operations the instantaneous transmit power might be increased to maintain a desired call quality or reliability of the transmission. However, if the incremental power is not available, aspects of the disclosure may entail "falling back" to operation that utilizes the entirety of the TTI. For example, if transmitter power is headroom limited, operation may fall back from a DTX configuration consuming a portion of a TTI window to a non-DTX configuration consuming the entirety or substantially all of the TTI window. In this respect, a changing, or dynamic switching between DTX and non-DTX configurations may be provided. Available power (e.g., as provided by a transmission power parameter 130, which may correspond to a power headroom, stored in memory 105 of FIG. 1) relative to a threshold (e.g., a threshold 124 stored in memory 105 of FIG. 1) may be examined by, e.g., the processor 104 to determine whether to transmit using a portion or the entirety of a TTI window, and may be based on an identification of the packet or data that is being transmitted. While shown separately in FIG. 1, the threshold 124 and the transmission power parameter 130 may be combined into a common parameter.

The memory 105 of FIG. 1 may include one or more values of a spreading factor parameter 128, which may be examined by the processor 104 to select a spreading factor for use. For example, for downlink channel coding and frame processing, the spreading factor may be set to a value of 128, as specified in 3GPP standards for circuit-switched voice calls utilizing a 20 ms TTI. However, in some aspects of the disclosure, a spreading factor may be set to a reduced value of 64 for circuit-switched voice calls utilizing the 20 ms TTI. By utilizing the reduced spreading factor, a bit is enabled to span a shorter duration than it otherwise would. Thus, in an aspect of the present disclosure, the reduction in spreading factor, e.g., to a spreading factor of 64, may be used to obtain a transmission that consumes a portion of a TTI window as described above in connection with FIG. 7.

In this example, in a further aspect of the disclosure, the transmission power may be increased to compensate for any reduction in quality that may be experienced due to the reduction in transmission time per bit. The memory 105 may include the transmission power parameter 130 to enable the processor 104 to select a transmission power to use. One or more power control mechanisms or techniques may be used to automatically determine the amount of increase in transmission power, as described in further detail below.

In still another aspect of the disclosure, a puncturing technique may be used in connection with using a portion of a voice or data frame for transmission as described above with respect to FIG. 7. Puncturing entails the elimination of one or more bits, such as bits that might otherwise have been included for quality (e.g., redundancy or reliability) purposes. Referring to FIG. 1, the memory 105 includes a puncturing parameter 132 that may be examined by the processor 104 to determine whether, and to what extent, to puncture. In some examples, a reduction in quality that might otherwise be experienced using puncturing may be compensated for by increasing transmission power. Additionally, in some examples, puncturing may be used as an alternative to reducing a spreading factor to enable the frames to be transmitted utilizing only a portion of the TTI.

The memory 105 may also include one or more rate matching attributes 134. In a UMTS network, rate matching is generally used to match a number of bits to be transmitted to the number of bits available in a single frame. This is generally achieved either by puncturing the bits of a frame, and/or by repetition of bits within a frame. Rate matching may be controlled in accordance with a suitable parameter, referred to herein as a rate matching attribute. That is, a rate matching attribute may be signaled from higher layers to calculate a rate matching value, which may correspond to an amount of puncturing to apply to a frame and/or an amount of repetition of bits to apply to a frame. Accordingly, in some aspects of the disclosure, a suitable rate matching attribute may be chosen in accordance with a desired amount of puncturing. Rate matching attributes 134 may additionally or alternatively be used to control or to determine an importance of a first packet relative to one or more additional packets. Here, if a first packet is determined to be more important than a second packet based on the rate matching attributes 134, the first packet may undergo less puncturing relative to the second packet. The amount of puncturing, such as the total amount of puncturing performed by a system, may be based on a capacity of one or more channels (e.g., logical or transport channels that map to physical channels). The rate matching attributes 134 may be based on, or defined in, one or more standards or specifications (e.g., a physical layer specification) and may be expressed, illustratively, in terms of a numeric value within a predetermined range of values. One or more layers may assign a rate matching attribute 134 for each transport channel. The number of bits on a transport channel can vary between different TTIs.

An explicit signal may be used to determine an amount of puncturing to perform. The use of an explicit signal may be in addition to or as an alternative to the use of rate matching attributes (e.g., rate matching attributes 134). The use of an explicit signal may provide greater flexibility, as the use of rate matching attributes is generally geared to, or based on, the size of the largest packet that may be transmitted. The use of an explicit signal may be used to tailor or customize puncturing for packets that are smaller than the largest packet that is supported. In one example, the explicit signal may be provided as part of a transport format combination set (TFCS) configuration. That is, a UMTS network provides signaling to define a TFCS configuration, wherein the TFCS is a set of formats that may be used for transport channels.

Another technique that may be used to provide power savings at a UE includes frame early termination (FET). Frame early termination entails terminating a transmission or receipt of a frame prior to the actual end of the frame. For example, a receiving device may be decoding a frame during the time while the frame is being received. Over time, while the frame continues to be received, the frame may in its entirety be correctly decoded. This may occur because of redundancy in the frame, especially when it includes a high degree of encoding and forward error correction. At the time that the frame is decoded, the receiving device may be enabled to shut off its receiver. Furthermore, the receiving device may be enabled to transmit feedback, such as an acknowledgment message, to the transmitting device. Accordingly, the transmitting device may be enabled to terminate transmission of the frame prior to its complete transmission. This frame early termination scheme can reduce the power consumption at both the transmitting and receiving device, as well as reduce over-the-air resources utilized by the transmission of the frame. Referring to FIG. 1, the memory 105 is shown as including a frame early termination attribute 136. The frame early termination attribute 136 may indicate whether frame early termination is enabled or disabled. In some aspects of the disclosure, frame early termination may be combined with early decoding. In conjunction with early decoding, a receiver (e.g., receiver 535, 554 of FIG. 5) of a frame may detect that it has acquired the data of the frame prior to the end of the frame. The receiver may receive the data of the frame prior to the end of the frame as a result of redundancy present in the data. If the receiver obtains any needed data prior to the end of the frame, the receiver can power-down or turn-off to enable power savings. The receiver can also transmit an acknowledgement to the transmitter (e.g., transmitter 556, 532 of FIG. 5) of the frame. The transmitter, upon receipt of the acknowledgment, may stop transmitting the frame to conserve resources and may power-down to enable power savings.

In accordance with aspects of the disclosure, early decoding may be facilitated by the use of a common integrity check (e.g., a cyclic redundancy check (CRC)) with respect to multiple classes of bits, which may be denoted as class A, class B, and class C as described above. That is, in a conventional AMR codec, an integrity check may be applied or determined only for a single class (e.g., class A). In this way, the information that is most sensitive to errors (e.g., class A bits) may be better preserved. According to an aspect of the disclosure wherein early decoding is utilized, if the early decoding performed on the first class indicates that the decoding is successful (e.g., the CRC passes), it may be assumed that the second and third classes (e.g., class B and class C) are also acceptable in terms of their error rates. However, the second and third classes may in fact suffer from a degradation in quality even though the first class was acceptable. Accordingly, some aspects of the disclosure are directed to application of a common integrity check for all of the class A, class B, and class C bits, thereby improving the reliability of early decoding in terms of obtaining an error free transmission of the class A, class B, and class C bits.

To provide for the common integrity check for the several classes of bits, a joint encoding of class A, class B, and class C bits may be provided. Here, jointly encoding the several classes of bits may refer to the application of a single, suitable encoding algorithm to all of the classes of bits together. As described above, because class A bits are more sensitive to errors, they are conventionally more robustly encoded than class B and C bits. By jointly encoding the several classes, there may be some impact to the total throughput, since, to ensure the integrity of class A bits, the less important class B and C bits would be robustly encoded, increasing redundancy. However, on the other hand, by jointly encoding the bits, a successful decoding of the class A bits, potentially based on one or more error checking algorithms or values (e.g., a checksum value, a CRC value, etc.), may enable frame early termination with respect to the class B and C bits without increasing a bit error rate (BER) of the class B and C bits that might otherwise occur if the class A, B, and C bits were not jointly encoded.

In accordance with aspects of the disclosure, the memory 105 of FIG. 1 includes an encode rate parameter 138. The encode rate parameter 138 may include encoding rates for use by an encoder. The TTI configuration of FIG. 7 described above may be obtained by encoding with a higher rate code relative to a baseline rate code.

Figure 8:
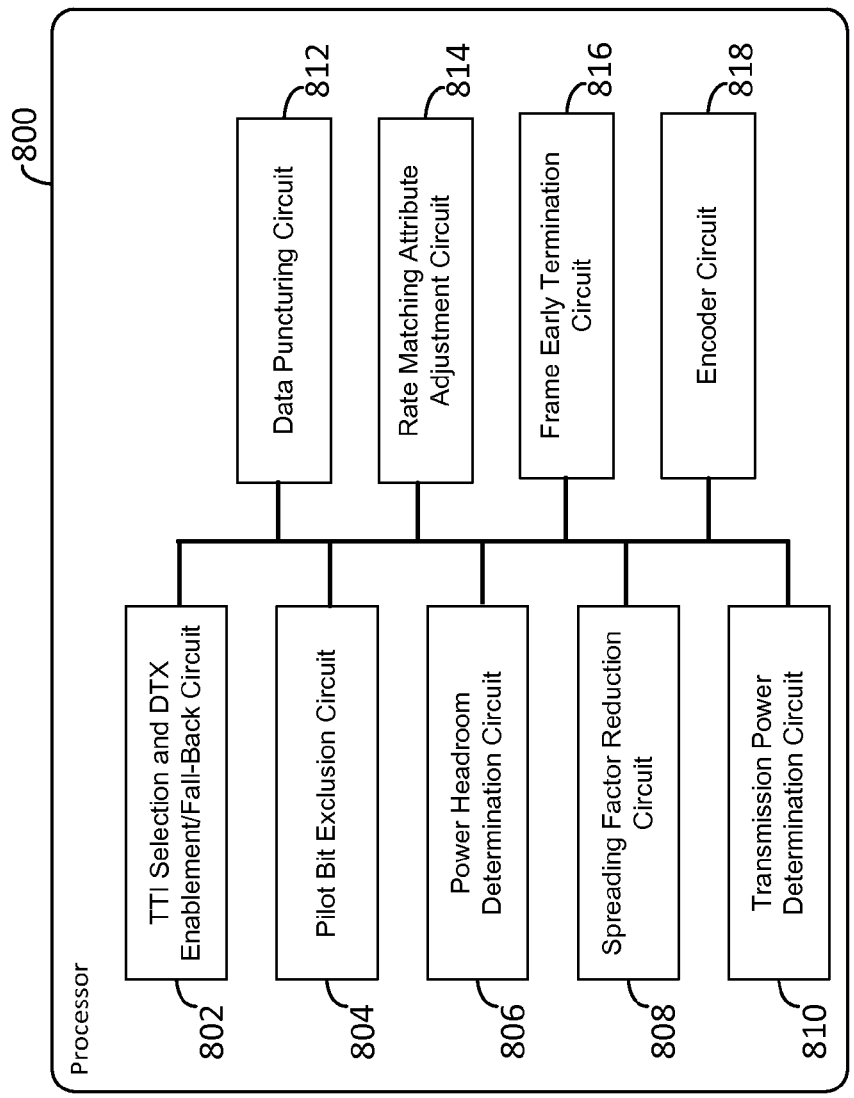
FIG. 8 is a block diagram of an apparatus including circuits for performing wireless communication using the portion of the TTI of FIG. 7.

Referring now to FIG. 8, a processor 800 configured for performing wireless communication is shown. In some examples, the processor may be the same as the processor 104 described above and illustrated in FIG. 1, and/or one or more of the processors 560, 570, 582, 590, and 594 of FIG. 5. The processor 800 may function to enable an apparatus, such as a UE as illustrated in FIGS. 1, 2, 3, and/or 5, to engage in wireless communication using DTX in the manner described above, e.g., in connection with FIG. 7. The processor 800 includes one or more circuits, which may serve as means for performing one or more processes or algorithms, such as the algorithms described below, e.g., in relation to FIG. 13. The processor 800 may be operative on the basis of one or more parameters or values, such as those stored in the memory 105 of FIG. 1.

The apparatus 800 includes a TTI selection and DTX enablement/fallback circuit 802. The circuit 802 may enable a selection of a TTI or TTI window, or one or more portions thereof, which may be used to transmit and receive packets or frames (e.g., voice frames). The selection of the TTI or TTI window, or one or more portions thereof, may be dynamic in the sense that the selection or duration of the TTI window utilized for the DTX transmission may change over time. The circuit 802 may selectively enable DTX operations. For example, based on one or more factors or parameters, such as a power that is available to a UE (e.g., UE 550), DTX may be enabled or disabled, or the UE may change between the DTX configuration and the non-DTX configuration. In some examples, the circuit 802 may be operative at least in part on the basis of the TTI value(s) 122 of FIG. 1.

A pilot bit exclusion circuit 804 may select, in part, a slot format associated with the transmission of one or more frames. The selected slot format may exclude pilot bits as described above. The circuit 804 may be operative at least in part on the basis of the slot format parameter 126 of FIG. 1.

A power headroom determination circuit 806 may determine whether power headroom is limited (e.g., when an amount of desired power approaches a power limit or power capacity) with respect to a device, e.g., UE 550. In some examples, the power headroom determination circuit 806 may provide a signal or status flag to indicate when the limit has been reached. The status flag may be used by the circuit 802 to select or change a TTI window or enable/disable DTX. The circuit 806 may be operative at least in part on the basis of the threshold 124 and/or the transmission power 130 of FIG. 1.

A spreading factor reduction circuit 808 may select or reduce a spreading factor. An output of the spreading factor reduction circuit 808 may be used by the circuit 802 to select or change a TTI window. The circuit 808 may be operative at least in part on the basis of the spreading factor parameter 128 of FIG. 1.

A transmission power determination circuit 810 may select or adjust a power that is used for transmission. For example, the circuit 810 may determine or measure one or more environmental conditions in selecting a power for transmission. In another example, the circuit 810 may select or adjust a transmission power in accordance with whether the UE is operating in a DTX configuration or a non-DTX configuration. The circuit 810 may be operative at least in part on the basis of the threshold 124 and/or the transmission power parameter 130 of FIG. 1.

A data puncturing circuit 812 may determine whether, and to what extent, puncturing of the bits of frames is performed. The circuit 812 may be operative at least in part on the basis of the puncturing parameter 132.

A rate matching attribute adjustment circuit 814 may select and/or adjust one or more rate attributes. For example, the rate matching attribute adjustment circuit 814 may be configured to rate or prioritize a first packet relative to one or more additional packets. The rating/prioritization provided by the rate matching attribute adjustment circuit 814 may be used as an input to the data puncturing circuit 812. The rate matching attribute adjustment circuit 814 may be operative at least in part on the basis of the rate matching attribute 134 of FIG. 1.

A frame early termination circuit 816 may determine whether it is appropriate to shut off transmission or reception of data associated with one or more frames. For example, the circuit 816 may determine when a first portion of data associated with a frame has been decoded, such that the remainder of the data associated with the frame can be ignored. The circuit 816 may be operative at least in part on the basis of a frame early termination (FET) attribute 136 of FIG. 1.

An encoder circuit 818 may provide an encoding of data in connection with one or more frames (e.g., voice frames). In some examples, the encoder circuit 818 may be the same as one or more blocks in FIGS. 10-12, including but not limited to convolution coding block 1208. The circuit 818 may perform such encoding based at least in part on one or more encoding rates which may be provided by an encode rate parameter 138 of FIG. 1.

Figure 9:
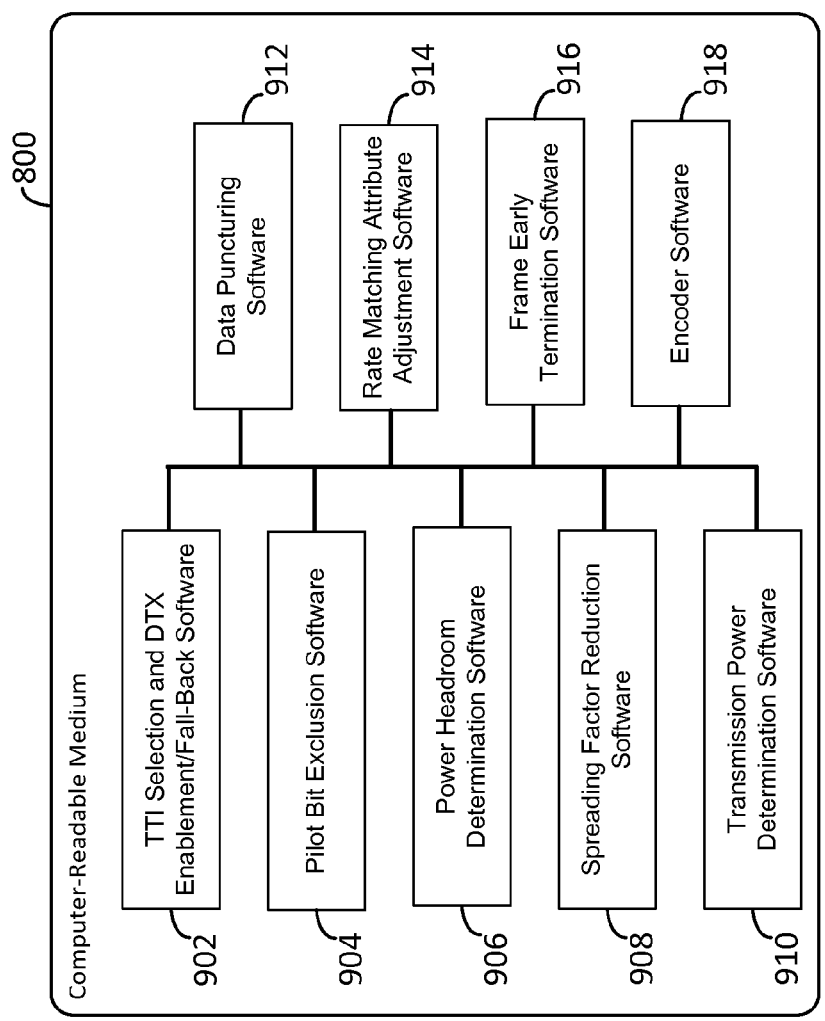
FIG. 9 is a block diagram of a computer-readable medium including software for performing wireless communication using the portion of the TTI of FIG. 7.

FIG. 9 illustrates software of a computer-readable medium 900 for performing wireless communication. The computer-readable medium 900 may correspond to the computer-readable medium 106 of FIG. 1. The software (e.g., software 107 of FIG. 1) of the computer-readable medium 900 may include instructions, such as executable instructions, for performing one or more algorithms (e.g., an algorithm associated with FIG. 13). The computer-readable medium 900 may be operative on the basis of one or more parameters or values, such as those stored in the memory 105 of FIG. 1.

The computer-readable medium 900 includes a TTI selection and DTX enablement/fallback software 902. The software 902 may enable a selection of a TTI or TTI window, or one or more portions thereof, which may be used to transmit and receive packets or frames (e.g., voice frames). The selection of the TTI or TTI window, or one or more portions thereof, may be dynamic in the sense that the selection or duration of the TTI window utilized for the DTX transmission may change over time. The software 902 may selectively enable DTX operations. For example, based on one or more factors or parameters, such as a power that is available to a UE (e.g., UE 550), DTX may be enabled or disabled, or the UE may change between the DTX configuration and the non-DTX configuration. In some examples, the software 902 may be operative at least in part on the basis of the TTI value(s) 122 of FIG. 1.

A pilot bit exclusion software 904 may select, in part, a slot format associated with the transmission of one or more frames. The selected slot format may exclude pilot bits as described above. The software 904 may be operative at least in part on the basis of the slot format parameter 126 of FIG. 1.

A power headroom determination software 906 may determine whether power headroom is limited (e.g., when an amount of desired power approaches a power limit or power capacity) with respect to a device, e.g., UE 550. In some examples, the power headroom determination software 906 may provide a signal or status flag to indicate when the limit has been reached. The status flag may be used by the software 902 to select or change a TTI window or enable/disable DTX. The software 906 may be operative at least in part on the basis of the threshold 124 and/or the transmission power 130 of FIG. 1.

A spreading factor reduction software 908 may select or reduce a spreading factor. An output of the spreading factor reduction software 908 may be used by the software 802 to select or change a TTI window. The software 908 may be operative at least in part on the basis of the spreading factor parameter 128 of FIG. 1.

A transmission power determination software 910 may select or adjust a power that is used for transmission. For example, the software 910 may determine or measure one or more environmental conditions in selecting a power for transmission. In another example, the circuit 810 may select or adjust a transmission power in accordance with whether the UE is operating in a DTX configuration or a non-DTX configuration. The circuit 910 may be operative at least in part on the basis of the threshold 124 and/or the transmission power parameter 130 of FIG. 1.

A data puncturing software 912 may determine whether, and to what extent, puncturing of the bits of frames is performed. The software 912 may be operative at least in part on the basis of the puncturing parameter 132.

A rate matching attribute adjustment software 914 may select and/or adjust one or more rate attributes. For example, the rate matching attribute adjustment software 914 may be configured to rate or prioritize a first packet relative to one or more additional packets. The rating/prioritization provided by the rate matching attribute adjustment software 914 may be used as an input to the data puncturing software 912. The rate matching attribute adjustment software 914 may be operative at least in part on the basis of the rate matching attribute 134 of FIG. 1.

A frame early termination software 916 may determine whether it is appropriate to shut off transmission or reception of data associated with one or more frames. For example, the software 916 may determine when a first portion of data associated with a frame has been decoded, such that the remainder of the data associated with the frame can be ignored. The software 916 may be operative at least in part on the basis of the frame early termination (FET) attribute 136 of FIG. 1.

An encoder software 918 may provide an encoding of data in connection with one or more frames (e.g., voice frames). The software 918 may perform such encoding based at least in part on one or more encoding rates which may be provided by the encode rate parameter 138 of FIG. 1.

In the following disclosure, details are provided on how the voice packets may be encoded and transmitted using the portion of the TTI or TTI window of FIG. 7 in accordance with one or more examples. Furthermore, techniques and methods are described, which may reduce or avoid a potential impact to link efficiency and uplink coverage due to using a portion of the TTI for a DTX transmission of voice frames.

Downlink Channel Coding and Transmission Time Interval (TTI) Processing of Baseline Adaptive Multi-Rate (AMR) 12.2 Kbps Circuit-Switched (CS) Voice Service on Rel-99 DCH As background information, some relevant details on how AMR 12.2 kbps CS voice frames are transmitted on the downlink dedicated traffic channel (DTCH) along with the Signalling Radio Bearer (SRB) that is mapped to the Dedicated Control Channel (DCCH) are presented in this section as a baseline for further discussion in the sections that follow.

Table 1 lists the channel coding parameters for the CS Voice packet bits (Class A/B/C, silence identifier (SID) and NULL) as well as the SRB bits sent on the DCCH using a number of fields.

TABLE 1

Channel coding parameters for 12.2 kbps Speech plus 3.4 kbps DCCH

| Parameter | Class A | | | Class B | Class C | DCCH |
|---|---|---|---|---|---|---|
| Information bits | FULL 81 | SID 39 | NULL 0 | 103 | 60 | 148 |
| CRC | | 12 | | — | — | 16 |
| Encoder tail bits | | 8 | | 8 | 8 | 8 |

TABLE 1-continued

Channel coding parameters for 12.2 kbps Speech plus 3.4 kbps DCCH

| Parameter | Class A | | Class B | Class C | DCCH |
|---|---|---|---|---|---|
| Convolutional code rate | 1/3 | | 1/3 | 1/2 | 1/3 |
| Encoder O/P | 303 | 177 | 60 | 333 | 136 | 516 |
| TTI | | 20 ms | | 20 ms | 20 ms | 40 ms |
| SF | | | | 128 | | |

In Table 1 above, the information bits field represents a number of data or payload bits that are transmitted. The CRC field represents a number of cyclic redundancy check bits used for integrity purposes as part of a decoding procedure at a receiver. The encoder tail bits field represents a count corresponding to a fixed sequence of bits added to the end of a block of data (where the block of data may correspond to the information bits) to reset a convolutional encoder to a predefined state. The encoder O/P field represents the number n of bits in the encoder's output. The convolutional code rate field represents a transformation of the information and CRC bits (of total count m) into an n-bit codeword, where m/n is the code rate. The TTI field represents the transmission time interval. The SF field represents a spreading factor.

Table 2 lists different rate matching attributes configured in different UMTS networks. Table 2 provides values for each of cases labeled/numbered 1, 3, 4, and 5 for dedicated traffic channel (DTCH) classes A, B, and C and a dedicated control channel (DCCH). The values for the DTCH classes and the DCCH in Table 2 represent parameters that may be configured as specified in 3GPP R99 standards for UMTS. Specifically, there may be one set of parameters configured on each transport channel, as shown in the table, for determining a relative priority of the corresponding transport channel in the rate matching algorithm, which distributes the available channel bits to the encoded output streams.

Without loss of generality, Case 3 shown in Table 2 is used in connection with different schemes described below. The concepts behind the proposed schemes are equally applicable in the other cases as well.

TABLE 2

Rate Matching Attributes of Downlink Adaptive Multi-Rate (AMR) Voice

| Case | DTCH Class A | DTCH Class B | DTCH Class C | DCCH |
|---|---|---|---|---|
| 1 | 196 | 202 | 256 | 210 |
| 3 | 180 | 170 | 215 | 230 |

TABLE 2-continued

Rate Matching Attributes of Downlink Adaptive Multi-Rate (AMR) Voice

| Case | DTCH Class A | DTCH Class B | DTCH Class C | DCCH |
|---|---|---|---|---|
| 4 | 180 | 175 | 234 | 180 |
| 5 | 137 | 130 | 161 | 180 |

Figure 10:
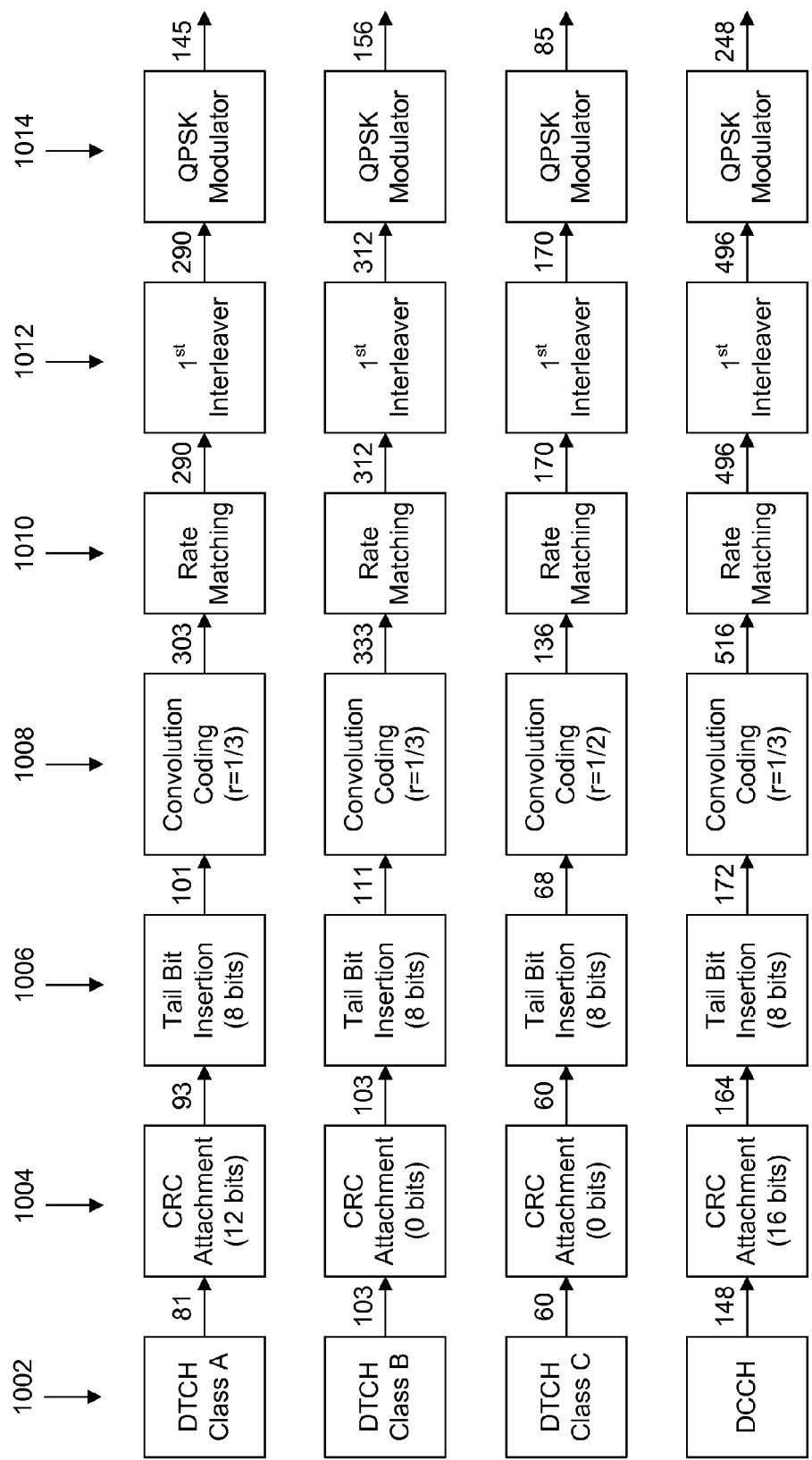
FIG. 10 is a diagram illustrating Channel Coding and Modulation for a dedicated traffic channel (DTCH) (Full Rate adaptive multi-rate (AMR) 12.2 kbps)/dedicated control channel (DCCH).

Table 3 and FIG. 10 list and illustrate, respectively, according to some aspects of the present disclosure, the various stages of channel coding prior to spreading and RF modulation for Case 3 of Table 2 above, for each of DTCH classes A, B, and C, and DCCH (3.4 kbps SRB) which are referenced in a stage 1002. The different stages are labelled 1002-1014 in FIG. 10 and, where appropriate, are referenced in Table 3. In various aspects of the disclosure, each of the blocks 1002-1014 may be implemented by the processor 104 (e.g., in coordination with the software 107 stored on the computer-readable medium 106) illustrated in FIG. 1, the processor 540 and/or 594 illustrated in FIG. 5, and/or the processor 800 (e.g., in coordination with the computer-readable medium 900) illustrated in FIGS. 8/9.

As shown in FIG. 10, the general flow is: (1) from stage 1002 to a CRC attachment stage 1004, (2) from the CRC attachment stage 1004 to a tail bit insertion stage 1006, (3) from the tail bit insertion stage 1006 to a convolution coding stage 1008, (4) from the convolution coding stage 1008 to a rate matching stage 1010, (5) from the rate matching stage 1010 to a first ($1^{st}$) interleaver stage 1012, and (6) from the first interleaver stage 1012 to a quadrature phase-shift keying (QPSK) modulator stage 1014.

The stage 1002 provides information or data (that is potentially sourced from data source 512 and/or data source 578 of FIG. 5) that is to be transmitted over a communication channel, potentially as part of a packet or frame. The CRC attachment stage 1004 adds or appends CRC bits that can be utilized by a receiver (e.g., receiver 535 or 554 of FIG. 5) to determine whether the information or data that is conveyed over the communication channel has been successfully received. The tail bit insertion stage 1006 adds or inserts a count corresponding to a fixed sequence of bits to reset the convolutional coding stage 1008 to a predefined state. The convolutional coding stage 1008 performs a transformation of information/data bits (of count m) into an n-bit symbol, where m/n is the code rate. The rate matching stage 1010 performs rate matching in the manner described above. The interleaver stage 1012 interleaves or shuffles symbols across several code words or packets, which may be used to increase the probability that a packet will be received successfully. The modulator stage 1014 may perform modulation by combining the output of the interleaver stage 1012 with a carrier.

TABLE 3

Downlink Adaptive Multi-Rate (AMR) Voice (12.2 kbps)
Channel Coding and Modulation Parameters
Channel Coding and Modulation Parameters

| | DTCH Class A (stage 802) | DTCH Class B (stage 802) | DTCH Class C (stage 802) | DCCH 3.4 kbps SRB (stage 802) |
|---|---|---|---|---|
| TTI [ms] | 20 | 20 | 20 | 40 |
| Number of Info Bits (output of stage 802) | 81 | 103 | 60 | 148 |
| CRC attachment (stage 804) | 12 | 0 | 0 | 16 |

TABLE 3-continued

Downlink Adaptive Multi-Rate (AMR) Voice (12.2 kbps)
Channel Coding and Modulation Parameters
Channel Coding and Modulation Parameters

|  | DTCH Class A (stage 802) | DTCH Class B (stage 802) | DTCH Class C (stage 802) | DCCH 3.4 kbps SRB (stage 802) |
|---|---|---|---|---|
| Tail Bit Insertion (stage 806) | 8 | 8 | 8 | 8 |
| Channel Coding (output of stage 808) | 303 | 333 | 136 | 516 |
| Number of Bits to Repeat/Puncture | −13 | −21 | 34 | −20 |
| Rate Matching Output (output of stage 810) | 290 | 312 | 170 | 496 |
| 1st Interleaver Output (output of stage 812) | 290 | 312 | 170 | 496 |
| QPSK Modulator Output (Number of I/Q Symbols) (output of stage 814) | 145 | 156 | 85 | 248 |
| Number of DPDCH Symbols per 10 ms | 72.5 | 78 | 42.5 | 62 |
| Number of DPCCH Symbols per 10 ms | 45 (15 slots *3 symbols: 3 symbols = 2 Pilot + 1 TPC per slot) | | | |
| Total Number of DPCH Symbols per 10 ms | 300 | | | |

Scheme a: Reduce Spreading Factor by Half, Circuit-Switched (CS) Voice on 10 ms Transmission Time Interval (TTI), Signalling Radio Bearer (SRB) on 20 ms TTI In this scheme, the downlink channel coding and frame processing may be identical to a baseline channel coding and frame processing as specified in 3GPP standards for a circuit-switched voice call utilizing a 20 ms TTI. However, in an aspect of the present disclosure, the spreading factor may be reduced, or selected to take a value such that the spreading of the voice frames utilizing the selected spreading factor only fills a portion of the TTI. For example, if the spreading factor is reduced by a factor of 2 relative to the baseline, i.e., from 128 to 64, the voice frames can be transmitted in the first half of the 20 ms TTI.

Figure 11:
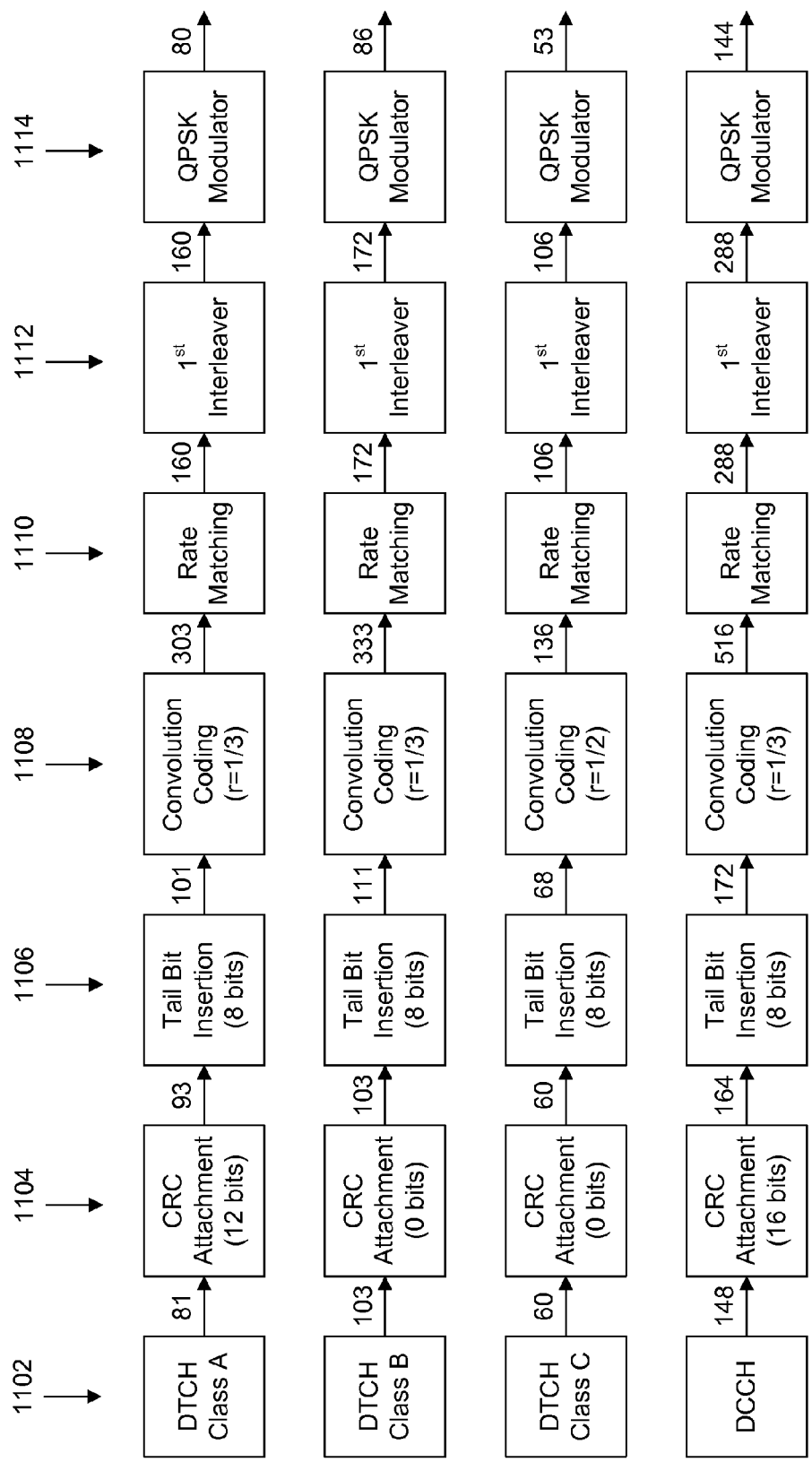
FIG. 11 is a diagram illustrating Channel Coding and Modulation for a DTCH (Full Rate AMR 12.2 kbps)/DCCH in accordance with a Scheme B1.

Scheme B1: Maintain Same Spreading Factor, Circuit-Switched (CS) Voice on 10 ms Transmission Time Interval (TTI), Signalling Radio Bearer (SRB) on 40 ms TTI Since Scheme A described above may suffer from a loss of dimensionality in channelization code space, an alternate scheme that may reduce or avoid this consequence is to map the DTCH carrying CS voice onto a 10 ms TTI and the DCCH carrying SRB onto a 40 ms TTI, while still maintaining the same spreading factor (128) as the baseline described above. One technique to achieve this, according to another aspect of the present disclosure, is listed in Tables 4 and 5 and illustrated in FIG. 11. Much like FIG. 10 described above, FIG. 11 includes various stages 1102-1114 of channel coding. The stages 1102-1114 are referenced in Tables 4-5, where appropriate. Specifically, tables 4-5 and FIG. 11 show the number of bits output by the rate matching block. In various aspects of the disclosure, each of the blocks 1102-1114 may be implemented by the processor 104 (e.g., in coordination with the software 107 stored on the computer-readable medium 106) illustrated in FIG. 1, the processor 540 and/or 594 illustrated in FIG. 5, and/or the processor 800 (e.g., in coordination with the computer-readable medium 900) illustrated in FIGS. 8/9.

As seen in Tables 4-5 and FIG. 11, the convolutional code rate for each of the Class A/B/C bits and SRB may be maintained as in the baseline design described above; however, in an aspect of the present disclosure, the amount of puncturing (as performed by, e.g., the puncturing circuit 812 or the puncturing software 912) in the rate matching block (block 1110) may be increased such that the punctured frames fill only a portion of the TTI (e.g., one half of the TTI). In some aspects of the disclosure, the amount of puncturing may be configured to rate match to 300 QPSK symbols every 10 ms. In some aspects of the disclosure, this increase in puncturing can be achieved through appropriate selection of rate matching attributes (e.g., rate matching attributes 134 of FIG. 1). Alternatively, if rate matching attributes do not give enough control over the amount of puncturing required, in a further aspect of the disclosure, suitable signalling may be utilized, e.g., as part of a transport format combination set (TFCS) that indicates the amount of puncturing/repetition on each transport channel for each transport format combination (TFC). In the example of Table 5, the puncturing can be achieved using rate matching attributes of 159, 155, 234, and 166 for the transport channels carrying Class-A, B, and C and DCCH bits respectively.

The large amount of puncturing in the SRB could potentially affect the SRB reliability. However, in a further aspect of the disclosure this can be mitigated as described below. For example, because puncturing applies to all the transport channels, power control may continue to ensure adequate reliability even under the higher puncturing. That is, SRB transmission power may be increased in accordance with an increased amount of puncturing. In another example, if the reliability of the punctured SRB is insufficient, the DPDCH symbols may be given an extra power-boost at the time when the SRB is transmitted. Here, the boost level may be selected to ensure reliability. In this example, inner-loop power control may be unaffected, since the DPCCH power is not changed. The boost in power may be based on the threshold 124 and/or the transmission power 130 of FIG. 1.

TABLE 4

Channel coding parameters for 12.2 kbps Speech plus 3.4 kbps DCCH

| Parameter | Class A (stage 902) | | | Class B (stage 902) | Class C (stage 902) | DCCH (stage 902) |
|---|---|---|---|---|---|---|
| Information bits (output of stage 902) | FULL 81 | SID 39 | NULL 0 | 103 | 60 | 148 |
| CRC (stage 904) | 12 | | | — | — | 16 |
| Encoder tail bits (stage 906) | 8 | | | 8 | 8 | 8 |
| Convolutional code rate (stage 908) | ⅓ | | | ⅓ | ½ | ⅓ |
| Encoder O/P | 303 | 177 | 60 | 333 | 136 | 516 |
| TTI | 10 ms | | | 10 ms | 10 ms | 40 ms |
| SF | | | | 128 | | |

TABLE 5

Downlink Adaptive Multi-Rate (AMR) Voice (12.2 kbps)
Channel Coding and Modulation Parameters (Scheme B1)
Channel Coding and Modulation Parameters

| | DTCH Class A (stage 902) | DTCH Class B (stage 902) | DTCH Class C (stage 902) | DCCH 3.4 kbps SRB (stage 902) |
|---|---|---|---|---|
| TTI [ms] | 10 | 10 | 10 | 40 |
| Number of Info Bits (output of stage 902) | 81 | 103 | 60 | 148 |
| CRC attachment (stage 904) | 12 | 0 | 0 | 16 |
| Tail Bit Insertion (stage 906) | 8 | 8 | 8 | 8 |
| Channel Coding (output of stage 908) | 303 | 333 | 136 | 516 |
| Number of Bits to Repeat/Puncture | −143 | −161 | −30 | −228 |
| Rate Matching Output (output of stage 910) | 160 | 172 | 106 | 288 |
| 1st Interleaver Output (output of stage 912) | 160 | 172 | 106 | 288 |
| QPSK Modulator Output (Number of I/Q Symbols) (output of stage 914) | 80 | 86 | 53 | 144 |
| Number of DPDCH Symbols per 10 ms | 80 | 86 | 53 | 36 |
| Number of DPCCH Symbols per 10 ms | 45 (15 slots *3 symbols: 3 symbols = 2 Pilot + 1 TPC per slot) | | | |
| Total Number of DPCH Symbols per 10 ms | 300 | | | |

Figure 12:
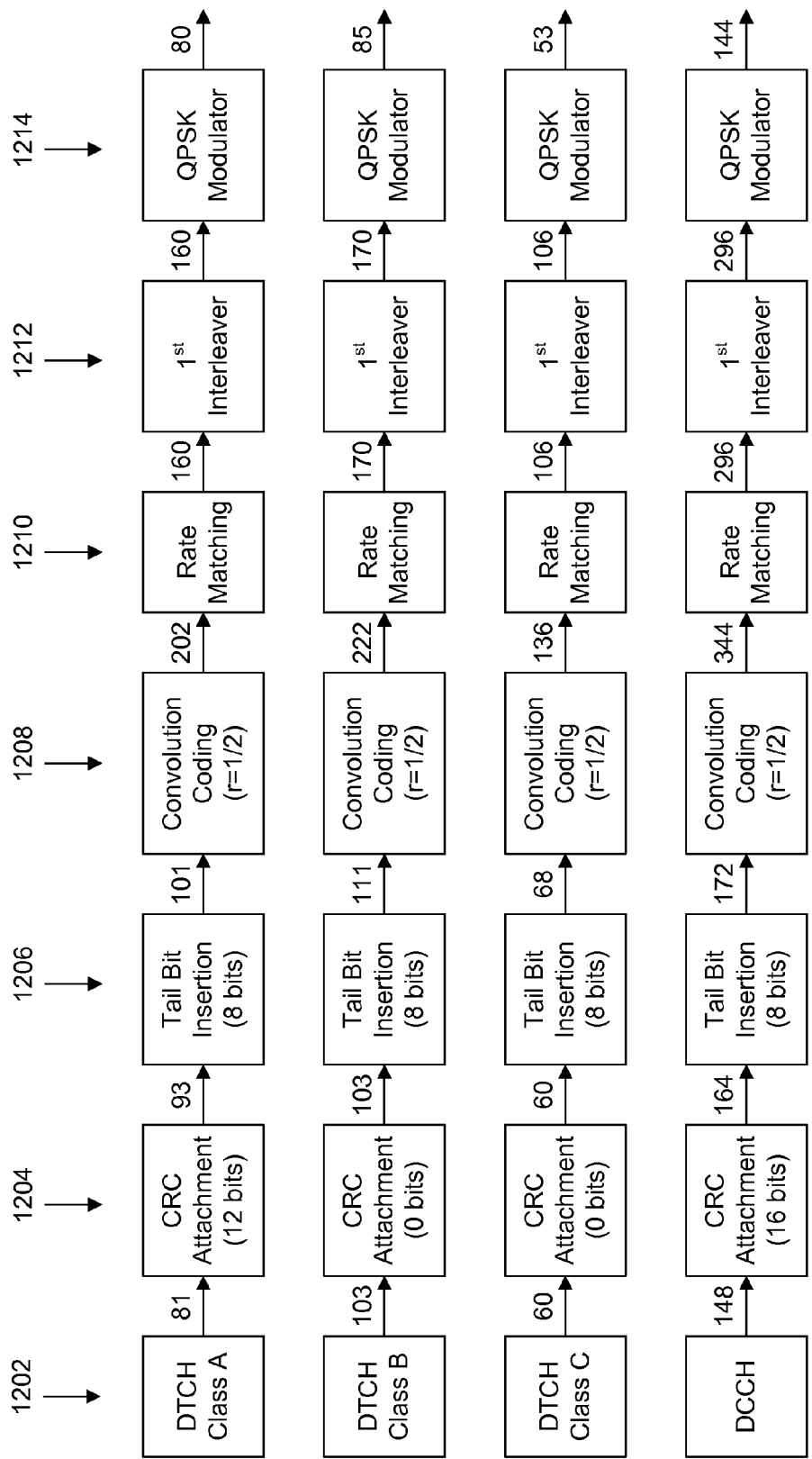
FIG. 12 is a diagram illustrating Channel Coding and Modulation for a DTCH (Full Rate AMR 12.2 kbps)/DCCH in accordance with a Scheme B2.

Scheme B2: Maintain Same Spreading Factor, Circuit-Switched (CS) Voice on 10 ms Transmission Time Interval (TTI), Signalling Radio Bearer (SRB) on 40 ms TTI An alternative to Scheme B1, where the same spreading factor is maintained as the baseline, is to instead change the convolutional encoder rates to ½ for Class A, B and DCCH information bits. That is, in some aspects of the disclosure, the convolutional encoder 1208 may be configured to encode the frames utilizing a suitable encoding rate such that the encoded voice frames fill only a portion of the TTI. As one example, the encoding rate (e.g., ½) may be selected to enable the encoded voice frame to fill only a first half of the TTI. This scheme is shown in Tables 6, 7 and FIG. 12. Much like FIGS. 10-11 described above, FIG. 12 includes various stages 1202-1214 of channel coding. The stages 1202-1214 are referenced in Tables 6-7, where appropriate. Specifically, tables 6-7 and FIG. 12 show the number of bits output by the rate matching block. In various aspects of the disclosure, each of the blocks 1202-1214 may be implemented by the processor 104 (e.g., in coordination with the software 107 stored on the computer-readable medium 106) illustrated in FIG. 1, the processor 540 and/or 594 illustrated in FIG. 5, and/or the processor 800 (e.g., in coordination with the computer-readable medium 900) illustrated in FIGS. 8/9.

Note that the rate matching block (block 1210) still ensures that 300 QPSK symbols are transmitted every 10 ms. The puncturing shown in Table 7 can be achieved using rate matching attributes of 182, 175, 179, 196 for the transport channels carrying Class-A,B,C and DCCH bits respectively.

TABLE 6

Channel coding parameters for 12.2 kbps Speech plus 3.4 kbps DCCH

| Parameter | Class A (stage 1002) | | | Class B (stage 1002) | Class C (stage 1002) | DCCH (stage 1002) |
|---|---|---|---|---|---|---|
| Information bits (output of stage 1002) | FULL 81 | SID 39 | NULL 0 | 103 | 60 | 148 |
| CRC (stage 1004) | | 12 | | — | — | 16 |
| Encoder tail bits (stage 1006) | | 8 | | 8 | 8 | 8 |
| Convolutional code rate (stage 1008) | | ½ | | ½ | ½ | ½ |
| Encoder O/P | 202 | 118 | 40 | 222 | 136 | 344 |
| TTI | | 10 ms | | 10 ms | 10 ms | 40 ms |
| SF | | | | 128 | | |

TABLE 7

Downlink Adaptive Multi-Rate (AMR) Voice (12.2 kbps)
Channel Coding and Modulation Parameters (Case 3)
Channel Coding and Modulation Parameters

| | DTCH Class A (stage 1002) | DTCH Class B (stage 1002) | DTCH Class C (stage 1002) | DCCH 3.4 kbps SRB (stage 1002) |
|---|---|---|---|---|
| TTI [ms] | 10 | 10 | 10 | 40 |
| Number of Info Bits (output of stage 1002) | 81 | 103 | 60 | 148 |
| CRC attachment (stage 1004) | 12 | 0 | 0 | 16 |
| Tail Bit Insertion (stage 1006) | 8 | 8 | 8 | 8 |
| Channel Coding (output of stage 1008) | 202 | 222 | 136 | 344 |
| Number of Bits to Repeat/Puncture | −42 | −52 | −30 | −48 |
| Rate Matching Output (output of stage 1010) | 160 | 170 | 106 | 296 |
| 1st Interleaver Output (output of stage 1012) | 160 | 170 | 106 | 296 |
| QPSK Modulator Output (Number of I/Q Symbols) (output of stage 1014) | 80 | 85 | 53 | 148 |
| Number of DPDCH Symbols per 10 ms | 80 | 85 | 53 | 37 |
| Number of DPCCH Symbols per 10 ms | 45 (15 slots *3 symbols: 3 symbols = 2 Pilot + 1 TPC per slot) | | | |
| Total Number of DPCH Symbols per 10 ms | 300 | | | |

A Few Variants and Enhancements

The above-described schemes A, B1 and B2 can be further modified and/or enhanced in accordance with one or more variations. For example, in an aspect of the disclosure, Class A/B/C bits may be concatenated, and transmitted in a single transport block. In this case, the convolutional coding rate and rate matching parameters can be modified accordingly to maintain the rate matching to the number of QPSK symbols transmitted per 10 ms in each of these schemes.

In another example, the pilot field in in the DPCCH may be reduced or completely eliminated. In a case where the pilot is eliminated from the DPCCH, its total length may be reduced from 45 symbols per radio frame to 15 symbols per radio frame.

In still another example, Frame Early Termination (FET) may be performed in any of these schemes. That is, in addition to any one or more of the reduced spreading factor, the modified coding rate, the puncturing of the voice frames, or the excluding of the pilot bits, the receiving device may transmit feedback (e.g., an ACK) indicating that a frame has been fully decoded, indicating to the transmitting device to early terminate transmission of the frame.

In a further example, a UE configured for uplink DTX in accordance with aspects of the present disclosure may be configured to make certain uplink transmissions during the remainder, or second portion, of the TTI, described above wherein the transmission of the voice frame is suspended. That is, while the transmission from the UE is suspended, it may occur that one or more channel filters at a receiver (e.g., a Node B) are turned off or otherwise dormant. Here, when the UE resumes its transmission during the next TTI, part of the transmitted voice frame might not properly be received at the receiver because it may not be suitably prepared to begin the transmission. Accordingly, in an aspect of the disclosure, the UE may be configured to transmit one or more parameters during one or more slots (e.g., a predetermined number of slots) during the remainder of the TTI, and prior to the start of the next TTI. For example, the UE may transmit one or more DPCCH parameters during the second portion of the TTI wherein the transmission is otherwise suspended. In this way, by receiving the one or more transmitted parameters, channel filters at the receiver (e.g., the Node B) may be refreshed.

Modifications to Uplink Configuration

Since a channelization code of each user is scrambled by a long scrambling code, channelization code resources do not represent a constraint in the uplink direction compared to the downlink direction. As a result, the spreading factor can be reduced by a factor of 2 and the CS Voice frames on DTCH can be mapped to a 10 ms TTI while the SRB frames on DCCH can be mapped to 40 ms TTI. While there is a loss of processing gain (3 dB) and slight loss of diversity, the large gap (10 ms) in transmission compensates for the increase in transmit power and receive signal-to-noise ratio (SNR) during the transmission time interval (10 ms) resulting in similar average transmit (Tx) power and receiver (Rx) energy per chip divided by the power density in a band (Ec/No) as the baseline.

Reconfiguring Between 10 ms TTI and 20 ms TTI to Ensure No Impact to Uplink Coverage In situations when the UE (e.g., UE 550) becomes power headroom limited (e.g., when an amount of desired power approaches a power limit or power capacity), the UE may not be able to transmit an uplink signal if it remains configured to utilize DTX, and this could impact uplink coverage of the voice call. Hence, in a further aspect of the disclosure, the UE may be configured for changing between the DTX configuration (e.g., using 10 ms of a 20 ms TTI window to transmit voice frames) to using the non-DTX configuration (e.g., using the full 20 ms TTI window) when such an event occurs. In various examples, one or more of a variety of triggers can be used to trigger or initiate this change.

In one example, at the time when the UE enters soft handover between multiple cells (e.g., cells 302, 304, and 306 of FIG. 3), the network (e.g., UTRAN 202, network 204 of FIG. 2) could configure the UE to change from a DTX configuration to a non-DTX configuration. Similarly, when the UE goes out of soft handover (e.g., when the Active Set size changes from >1 to 1), the UE could be reconfigured back to the DTX configuration.

In another example, at the time when the UE's total transmit power (e.g., as reflected in the transmission power parameter 130 of FIG. 1, or the transmit power headroom) crosses a threshold (e.g., threshold 124 of FIG. 1) with/without hysteresis, the UE may signal a corresponding event to either the Node B (e.g., Node B 208, Node B 510) or the RNC (e.g., RNC 206). At this time, the network may reconfigure the UE to the non-DTX configuration. Similarly when the UE's total transmit power falls below a threshold with/without hysteresis, the UE could be reconfigured back to the DTX configuration.

In still another example, as a part of conventional measurement reports, the UE indicates RF measurements such as a received signal strength indication (RSSI), a received signal code power (RSCP), a ratio of pilot power to total power (Echo), or a path loss. In an aspect of the present disclosure, one or more of these measurement report quantities can be compared against suitable thresholds to decide between using the DTX configuration and the non-DTX configuration. These measurements can be reported at the time of call setup on the random access channel (RACH) in CELL_FACH or in CELL_DCH after a call has been set up.

In still another example, the UE may keep track of the rate at which its transmit power changes (which may be reflected in the transmission power parameter 130 of FIG. 1). In an aspect of the present disclosure, if the rate of change of the transmit power exceeds or falls below a threshold (e.g., the threshold 124 of FIG. 1), the UE may inform the network of this event via signalling. Accordingly, the network may signal for the UE to change between a DTX mode and a non-DTX mode in accordance with the rate at which the UE's transmit power changes.

In still another example, the UE may be configured to determine whether a sequence of "n" consecutive uplink transmit power control (TCP) UP commands are received from the Node B. In a further aspect of the disclosure, the UE may change between the DTX configuration and the non-DTX configuration at a time that corresponds to the radio frame containing the "n" consecutive uplink power control UP commands.

In still another example, if the network experiences a high block error rate (BLER) on a channel carrying the voice frames, e.g., on the uplink DPDCH, the network may reconfigure the UE to change between the DTX configuration and the non-DTX configuration.

In a further aspect of the disclosure, in order to expedite the change between the DTX configuration and the non-DTX configuration, the UE may be preconfigured with both, e.g., 10 ms TTI and 20 ms TTI configurations. Accordingly, the Node B or RNC may signal the change between the DTX and non-DTX configurations with minimal signalling. For example, unused TFCI bits on the uplink can be used by the UE to signal to the Node B one or more of the above triggers. When the UE autonomously decides to change between the DTX and non-DTX configurations, such signalling can reduce the probability that the Node B fails to realize that the UE has changed the DTX configuration. For example, if the change is based on UE monitoring of uplink transmit power control (TPC) commands, then, since the Node B is issuing those TPC commands, it could use them to determine the DTX configuration. However this determination would be subject to error due to UE errors in decoding the TPC commands. Accordingly, explicit signalling of DTX configuration changes by the UE can reduce or avoid these errors.

In a further aspect of the disclosure, in order to avoid interruption in voice quality due to changing the DTX configuration, the uplink timing and T-DPCH (frame offset) can stay the same even if the DTX configuration has changed. This ensures a seamless transition during changes in the DTX configuration. Furthermore, if the channelization code remains the same on the downlink (as in Schemes B1, B2 or variant), the interruption would mainly be due to a change in channel coding, rate matching, and/or interleaving processing at the time of reconfiguration.

Figure 13:
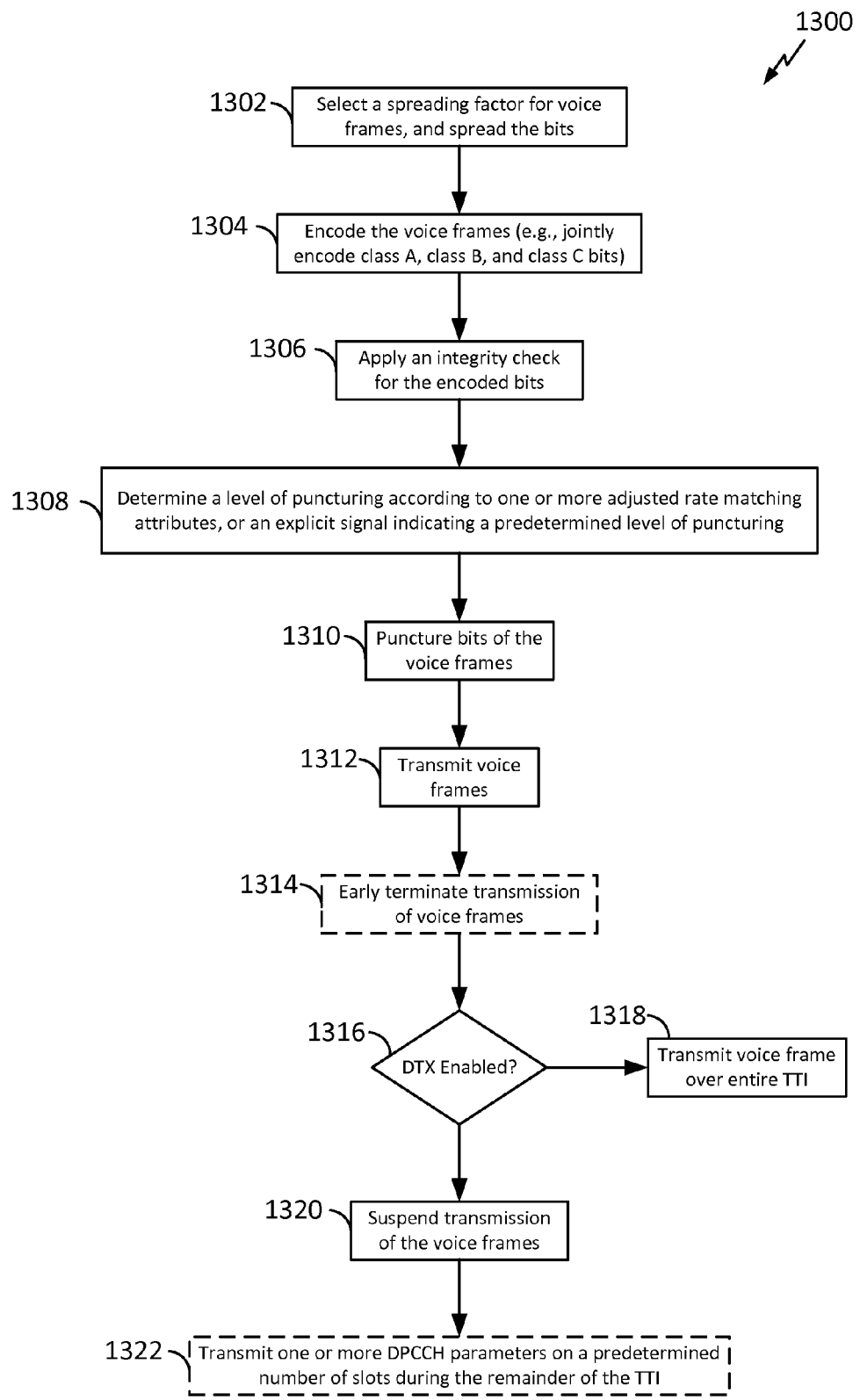
FIG. 13 is a flow chart of an exemplary method of wireless communication for transmitting and receiving voice frames.

Referring now to FIG. 13, a flow chart illustrating an exemplary process 1300 executed in conducting wireless communication according to aspects of the present disclosure is shown. In various examples, the process 1300 may be implemented by one or more of the apparatuses or structures illustrated in FIGS. 1, 2, 3, 5, 8, and/or 9, as described above. In other examples, the process may be implemented by any suitable means for carrying out the described functions.

At block 1302, a spreading factor reduction/selection circuit 808 (see FIG. 8), which may operate in coordination with spreading factor reduction/selection software 908, may select a spreading factor for the transmitted voice frames, and spread the bits of the voice frames. Here, the spreading factor may be selected such that the spread voice frames fill only a portion (e.g., half) of the TTI.

At block 1304, an encoder circuit 818, which may operate in coordination with encoder software 918, may encode voice frames utilizing a selected encoding rate, such that the encoded voice frames fill only the portion of the TTI (e.g., half of the TTI). In some examples, at block 1304 a plurality of classes of bits, such as class A, class B, and class C bits, may be jointly encoded as described above.

At block 1306, a CRC attachment stage or circuit 1004 may apply an integrity check for the encoded bits. In an example wherein plural classes of bits are jointly encoded, at block 1306 a common integrity check may be applied for the jointly encoded classes of bits.

At block 1308, a rate matching adjustment circuit 814, which may operate in coordination with a rate matching adjustment software 914, and/or a data puncturing circuit 812, which may operate in coordination with data puncturing software 912, may determine a level of puncturing according to one or more adjusted rate matching attributes, and/or according to an explicit signal indicating a predetermined level of puncturing.

At block 1310, a puncturing circuit 812, which may operate in coordination with data puncturing software 912, may puncture bits of the voice frames, such that the punctured voice frames fill only a portion of the TTI (e.g., half of the TTI).

At block 1312, a transceiver 110 may transmit the voice frames corresponding to the circuit-switched voice call during a portion of the TTI (e.g., half of the TTI). In some examples, the transmission may be an uplink transmission utilizing the UE transmitter 556; and in other examples, the transmission may be a downlink transmission utilizing the Node B transmitter 532. Here, a transmission power determination circuit 810, which may operate in coordination with transmission power determination software 910, may determine the power for the transmission of the voice frames, which may be based at least in part on various parameters, as described above. Furthermore, a pilot bit exclusion circuit 804, which may operate in coordination with pilot bit exclusion software 904, may exclude pilot bits from the slot format associated with the transmission of the voice frames. In this way, the transmission may proceed without the pilot bits.

At optional block 1314, a frame early termination circuit 816, which may operate in coordination with frame early termination software 916, may enable frame early termination by performing at least one of shutting off a receiver that receives the voice frames, or transmitting an acknowledgment to a transmitter of the voice frames.

At block 1316, the processor 104 may determine whether a DTX configuration is enabled. That is, as described above, the processor 104 may be enabled to change between a DTX configuration and a non-DTX configuration. If the non-DTX configuration is enabled, then the process may proceed to block 1318, wherein the transmitter 556 or 532 may transmit the voice frame over the entire TTI, e.g., not utilizing the DTX configuration. On the other hand, if the DTX configuration is enabled, then the process may proceed to block 1320, the transmitter 556 or 532 may suspend the transmission of the voice frames during the remainder of the TTI following the transmitted portion of the TTI (e.g., during the second half of the TTI).

At optional block 1322, the transmitter 556 or 532 may transmit one or more DPCCH parameters on a predetermined number of slots during the remainder of the TTI, prior to the start of a next TTI. In this way, the transmitter can enable a refreshing of a receiver's channel filters, as described above.

The process 1300 illustrated in FIG. 13 is illustrative. According to aspects of the disclosure, one or more of the blocks (or a portion thereof) may be optional. The blocks (or portions thereof) may execute in an order or sequence that is different from what is shown in FIG. 13.

The method or flowchart 1300, or one or more portions thereof, may correspond to an algorithm that may be used to perform wireless communication. This algorithm may be tied to, or executed by, one or more systems, devices, or components, such as the processor 104 of FIG. 1 and/or Node B 510, UE 550, or one or more of the processors 560, 570, 582, 590, and 594 of FIG. 5. Different aspects of the method 1300 may be tied to or executed by one or more of the circuits of FIG. 8 and/or one or more items of software of FIG. 9 as described above.

Of course, in the above examples, the circuitry included in the processors is merely provided as an example, and other means for carrying out the described functions may be included within various aspects of the present disclosure, including but not limited to the instructions stored in the computer-readable medium 106, or any other suitable apparatus or means described in any one of the FIGS., and utilizing, for example, the processes and/or algorithms described herein in relation to FIG. 13.

In accordance with aspects of the disclosure, the above discussed techniques, schemes, methods, components, devices, and systems may be implemented in the transmitter and/or receiver of both a UE and/or Node B.

In accordance with aspects of the disclosure, a system is configured to implement one or more of the methods described herein.

In accordance with aspects of the disclosure, a system comprises means for implementing one or more of the methods described herein.

In accordance with aspects of the disclosure, a system comprises a processor and a memory, wherein the processor is configured to perform any of the methods described herein.

In accordance with aspects of the disclosure, a UE is configured to perform any of the methods described herein.

In accordance with aspects of the disclosure, a Node B is configured to perform any of the methods described herein.

In accordance with aspects of the disclosure, a computer-readable medium comprises software configured to perform any of the methods described herein.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, the method comprising:

transmitting voice frames corresponding to a circuit-switched voice call during a predetermined portion of a transmission time interval (TTI) that is less than an entirety of the TTI;

suspending the transmitting of voice frames during a remainder of the TTI following the predetermined portion of the TTI to enable discontinuous transmission (DTX) during the circuit-switched voice call; and changing between a DTX configuration comprising the transmitting the voice frames during the predetermined portion of the TTI and suspending the transmitting the voice frames during the remainder of the TTI, and a non-DTX configuration comprising transmitting the voice frames during the entirety of the TTI, wherein the non-DTX configuration is selected if a transmitter power headroom is less than a threshold, and wherein the DTX configuration is selected if the transmitter power headroom is greater than the threshold.

2. The method of claim 1, further comprising:

selecting a spreading factor for the transmitted voice frames such that a spreading of the voice frames utilizing the selected spreading factor fills only the predetermined portion of the TTI that is less than the entirety of the TTI.

3. The method of claim 1, further comprising at least one of:
encoding the voice frames utilizing an encoding rate such that the encoded voice frames fill only the predetermined portion of the TTI that is less than the entirety of the TTI; or
puncturing bits of the voice frames such that the punctured voice frames fill only the predetermined portion of the TTI that is less than the entirety of the TTI.

4. The method of claim 3, further comprising:
adjusting one or more rate matching attributes to obtain a predetermined level of puncturing, wherein the puncturing bits of the voice frames is in accordance with the predetermined level of puncturing.

5. The method of claim 3, further comprising:
receiving an explicit signal comprising a predetermined level of puncturing, wherein the puncturing bits of the voice frames is in accordance with the predetermined level of puncturing.

6. The method of claim 1, further comprising:
excluding pilot bits from a slot format associated with the transmission of the voice frames.

7. The method of claim 1, further comprising:
if the voice frames associated with the circuit-switched voice call are decoded prior to an expiration of the predetermined portion of the TTI, enabling frame early termination by performing at least one of: shutting off a receiver that receives the voice frames or transmitting an acknowledgment to a transmitter.

8. The method of claim 1, wherein the voice frames comprise a plurality of classes of bits corresponding to error sensitivity, the method further comprising:
jointly encoding the plurality of classes of bits; and
applying a common integrity check for the jointly encoded plurality of classes of bits.

9. The method of claim 1, wherein the changing between the DTX configuration and the non-DTX configuration is based on at least one of a user equipment's (UE's) Active Set size, one or more UE measurement reports, or a block error rate (BLER).

10. The method of claim 1, wherein the changing between the DTX configuration and the non-DTX configuration is based on at least one of a user equipment (UE) transmit power, a rate at which the UE transmit power changes, or a sequence of transmit power control commands received from a Node B.

11. The method of claim 1, further comprising:
signaling, by a user equipment (UE), the changing between the DTX configuration and the non-DTX configuration using one or more transport format combination indicator (TFCI) indices.

12. The method of claim 1, further comprising:
preserving configuration information during the changing between the DTX configuration and the non-DTX configuration, wherein the configuration information comprises a frame offset and a channelization code.

13. The method of claim 1, further comprising:
transmitting one or more dedicated physical control channel (DPCCH) parameters on a predetermined number of slots during the remainder of the TTI prior to a start of a next TTI to enable a refreshing of a receiver's channel filters.

14. The method of claim 1, further comprising:
increasing instantaneous transmit power during the predetermined portion of the TTI that is less than the entirety of the TTI.

15. An apparatus for wireless communication, the apparatus comprising:
at least one processor; and
a non-transitory computer-readable medium having instructions stored thereon and coupled to the at least one processor,
wherein the at least one processor is configured to execute the instructions to cause the apparatus to:
transmit voice frames corresponding to a circuit-switched voice call during a predetermined portion of a transmission time interval (TTI) that is less than an entirety of the TTI;
suspend the transmission of voice frames during a remainder of the TTI following the predetermined portion of the TTI to enable discontinuous transmission (DTX) during the circuit-switched voice call; and
change between a DTX configuration comprising the transmitting the voice frames during the predetermined portion of the TTI and suspending the transmitting the voice frames during the remainder of the TTI, and a non-DTX configuration comprising transmitting the voice frames during the entirety of the TTI, wherein the non-DTX configuration is selected if a transmitter power headroom is less than a threshold, and wherein the DTX configuration is selected if the transmitter power headroom is greater than the threshold.

16. The apparatus of claim 15, wherein the at least one processor is further configured to execute the instructions to cause the apparatus to:
select a spreading factor for the transmitted voice frames such that a spreading of the voice frames utilizing the selected spreading factor fills only the predetermined portion of the TTI that is less than the entirety of the TTI.

17. The apparatus of claim 15, wherein the at least one processor is further configured to execute the instructions to cause the apparatus to:
encode the voice frames utilizing an encoding rate such that the encoded voice frames fill only the predetermined portion of the TTI that is less than the entirety of the TTI; or
puncture bits of the voice frames such that the punctured voice frames fill only the predetermined portion of the TTI that is less than the entirety of the TTI.

18. The apparatus of claim 15, wherein the at least one processor is further configured to execute the instructions to cause the apparatus to:
exclude pilot bits from a slot format associated with the transmission of the voice frames.

19. The apparatus of claim 15, wherein the at least one processor is further configured to execute the instructions to cause the apparatus to:
enable frame early termination by performing at least one of: shutting-off a receiver that receives the voice frames or transmitting an acknowledgment to a transmitter, if the voice frames associated with the circuit-switched voice call are decoded prior to an expiration of the predetermined portion of the TTI.

20. The apparatus of claim 15, wherein the voice frames comprise a plurality of classes of bits corresponding to error sensitivity, and wherein the at least one processor is further configured to execute the instructions to cause the apparatus to:
- jointly encode the plurality of classes of bits; and
- apply a common integrity check for the jointly encoded plurality of classes of bits.

21. The apparatus of claim 15, wherein the at least one processor is further configured to execute the instructions to cause the apparatus to:
- transmit one or more dedicated physical control channel (DPCCH) parameters on a pre-determined number of slots prior to a start of a next TTI.

22. An apparatus for wireless communication, the apparatus comprising:
- means for transmitting voice frames corresponding to a circuit-switched voice call during a predetermined portion of a transmission time interval (TTI) that is less than an entirety of the TTI;
- means for suspending the transmitting of voice frames during a remainder of the TTI following the predetermined portion of the TTI to enable discontinuous transmission (DTX) during the circuit-switched voice call; and
- means for changing between a DTX configuration comprising the transmitting the voice frames during the predetermined portion of the TTI and suspending the transmitting the voice frames during the remainder of the TTI, and a non-DTX configuration comprising transmitting the voice frames during the entirety of the TTI, wherein the non-DTX configuration is selected if a transmitter power headroom is less than a threshold, and wherein the DTX configuration is selected if the transmitter power headroom is greater than the threshold.

23. The apparatus of claim 22, further comprising:
- means for selecting a spreading factor for the transmitted voice frames such that a spreading of the voice frames utilizing the selected spreading factor fills only the predetermined portion of the TTI that is less than the entirety of the TTI.

24. The apparatus of claim 22, further comprising at least one of:
- means for encoding the voice frames utilizing an encoding rate such that the encoded voice frames fill only the predetermined portion of the TTI that is less than the entirety of the TTI; or
- means for puncturing bits of the voice frames such that the punctured voice frames fill only the predetermined portion of the TTI that is less than the entirety of the TTI.

25. The apparatus of claim 22, further comprising:
- means for enabling frame early termination by performing at least one of: shutting-off a receiver that receives the voice frames or transmitting an acknowledgment to a transmitter, if the voice frames associated with the circuit-switched voice call are decoded prior to an expiration of the predetermined portion of the TTI.

26. A non-transitory computer-readable medium storing computer executable code, the computer executable code comprising:
- instructions for causing a computer to transmit voice frames corresponding to a circuit-switched voice call during a predetermined portion of a transmission time interval (TTI) that is less than an entirety of the TTI;
- instructions for causing the computer to suspend the transmitting of voice frames during a remainder of the TTI following the predetermined portion of the TTI to enable discontinuous transmission (DTX) during the circuit-switched voice call; and
- instructions for causing the computer to change between a DTX configuration comprising the transmitting the voice frames during the predetermined portion of the TTI and suspending the transmitting the voice frames during the remainder of the TTI, and a non-DTX configuration comprising transmitting the voice frames during the entirety of the TTI, wherein the non-DTX configuration is selected if a transmitter power headroom is less than a threshold, and wherein the DTX configuration is selected if the transmitter power headroom is greater than the threshold.

27. The non-transitory computer-readable medium of claim 26, wherein the computer executable code further comprises:
- instructions for causing the computer to select a spreading factor for the transmitted voice frames such that a spreading of the voice frames utilizing the selected spreading factor fills only the predetermined portion of the TTI that is less than the entirety of the TTI.

28. The non-transitory computer-readable medium of claim 26, wherein the computer executable code further comprises:
- instructions for causing the computer to enable frame early termination by performing at least one of: shutting-off a receiver that receives the voice frames or transmitting an acknowledgment to a transmitter, if the voice frames associated with the circuit-switched voice call are decoded prior to an expiration of the predetermined portion of the TTI.

* * * * *